United States Patent
Ko et al.

(10) Patent No.: US 12,356,349 B2
(45) Date of Patent: Jul. 8, 2025

(54) METHOD AND APPARATUS FOR SELECTING PLURALITY OF TIME SYNCHRONIZATIONS IN NR V2X

(71) Applicant: LG ELECTRONICS INC., Seoul (KR)

(72) Inventors: Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 359 days.

(21) Appl. No.: 18/007,728

(22) PCT Filed: Jun. 3, 2021

(86) PCT No.: PCT/KR2021/006954
§ 371 (c)(1),
(2) Date: Dec. 1, 2022

(87) PCT Pub. No.: WO2021/246804
PCT Pub. Date: Dec. 9, 2021

(65) Prior Publication Data
US 2023/0232351 A1    Jul. 20, 2023

Related U.S. Application Data

(60) Provisional application No. 63/034,955, filed on Jun. 4, 2020, provisional application No. 63/034,378, filed on Jun. 3, 2020.

(30) Foreign Application Priority Data

Jun. 17, 2020 (KR) .................. 10-2020-0073483

(51) Int. Cl.
*H04W 56/00* (2009.01)
*H04W 4/40* (2018.01)
(Continued)

(52) U.S. Cl.
CPC ..... *H04W 56/0015* (2013.01); *H04W 56/002* (2013.01); *H04W 72/25* (2023.01); *H04W 72/542* (2023.01); *H04W 4/40* (2018.02)

(58) Field of Classification Search
CPC ............ H04W 56/0015; H04W 72/25; H04W 72/542; H04W 56/002
See application file for complete search history.

(56) References Cited

U.S. PATENT DOCUMENTS

2017/0289935 A1   10/2017  Yoon
2021/0051617 A1*   2/2021  Gulati ............... H04W 56/0015
(Continued)

FOREIGN PATENT DOCUMENTS

WO        2020063873       4/2020

OTHER PUBLICATIONS

Nokia, "Remaining details of Sidelink Synchronization mechanism," 3GPP TSG-RAN WG1 Meeting #100bis, e-Meeting, R1-2001806, Apr. 2020, 11 pages.
(Continued)

*Primary Examiner* — Won Tae C Kim
(74) *Attorney, Agent, or Firm* — LEE, HONG, DEGERMAN, KANG & WAIMEY

(57) ABSTRACT

A method by which a first apparatus performs wireless communication is proposed. The method may comprise the steps of: selecting a first synchronization source, on the basis of a sidelink synchronization priority; obtaining a first synchronization, on the basis of the first synchronization source; receiving a plurality of synchronization signals from a plurality of synchronization sources; obtaining a plurality of synchronizations, on the basis of the plurality of synchronization signals; selecting a second synchronization source from among the plurality of synchronization sources, on the basis of a gap between a time related to the first synchro-
(Continued)

nization and a time related to a second synchronization being greater than or equal to a threshold value, wherein the second synchronization is obtained on the basis of the second synchronization source; and transmitting, to a second apparatus, a sidelink-synchronization signal block (S-SSB), on the basis of the first synchronization or the second synchronization. For example, the first synchronization source and the second synchronization source may comprise at least one of a global navigation satellite system (GNSS), a base station, or user equipment. For example, the S-SSB may comprise a sidelink primary synchronization signal (S-PSS), a sidelink secondary synchronization signal (S-SSS), and a physical sidelink broadcast channel (PSBCH).

15 Claims, 21 Drawing Sheets

(51) Int. Cl.
*H04W 72/25* (2023.01)
*H04W 72/542* (2023.01)

(56) References Cited

U.S. PATENT DOCUMENTS

2022/0159590 A1* 5/2022 Lee .................. H04W 4/40
2023/0124916 A1* 4/2023 Lindholm ........... H04W 56/002
370/329

OTHER PUBLICATIONS

CATT, "Remaining issues on sidelink synchronization mechanism in NR V2X," 3GPP TSG-RAN WG1 Meeting #101,e-Meeting, R1-2003614, May 2020, 11 pages.
Vivo, "Remaining issues on sidelink synchronization mechanism," 3GPP TSG-RAN WG1 #101, e-Meeting, R1-2003381, May 2020, 9 pages.
3rd Generation Partnership Project (3GPP), "UE procedure for reporting HARQ-ACK on sidelink," Section 16.3 of 3GPP TS 38.213 V16.1.0, 2 pages.
PCT International Application No. PCT/KR2021/006954, International Search Report dated Aug. 30, 2021, 4 pages.

* cited by examiner

METHOD AND APPARATUS FOR SELECTING PLURALITY OF TIME SYNCHRONIZATIONS IN NR V2X

CROSS-REFERENCE TO RELATED APPLICATIONS

This application is the National Stage filing under 35 U.S.C. 371 of International Application No. PCT/KR2021/006954, filed on Jun. 3, 2021, which claims the benefit of earlier filing date and right of priority to Korean Application No. 10-2020-0073483, filed on Jun. 17, 2020, and also claims the benefit of U.S. Provisional Application Nos. 63/034,378, filed on Jun. 3, 2020, and 63/034,955, filed on Jun. 4, 2020, the contents of which are all incorporated by reference herein in their entireties.

TECHNICAL FIELD

This disclosure relates to a wireless communication system.

BACKGROUND

[2] Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

On the other hand, in sidelink communication, a user equipment (UE) may select a final synchronization source from among neighboring synchronization sources (e.g., GNSS, gNB/eNB, RSU, UE, etc.) in consideration of a priority according to a synchronization (re)selection rule pre-configured or established by network. In this specification, a synchronization source may be referred to as a synchronization reference. At this time, a UE may perform SL communication using a cast type such as broadcast, group cast, or unicast according to the type of V2X service, a UE may use different synchronization timings between UEs related to a corresponding service according to each cast type. For example, when a synchronization (re)selection rules configured between an in-coverage UE and an out-coverage UE are different, or neighboring synchronization sources that can be recognized among the UEs are different, respectively, a case in which SL communication is impossible between UEs may occur.

In one embodiment, a method for performing wireless communication by a first device is proposed. The method may comprising: selecting a first synchronization source based on a sidelink synchronization priority; obtaining a first synchronization based on the first synchronization source; receiving a plurality of synchronization signals from a plurality of synchronization sources; obtaining a plurality of synchronizations based on the plurality of synchronization signals; selecting a second synchronization source among the plurality of synchronization sources, based on a gap between a time related to the first synchronization and a time related to a second synchronization being greater than or equal to a threshold value, wherein the second synchronization is obtained based on the second synchronization source; and transmitting a sidelink-synchronization signal block (S-SSB) block to a second device based on the first synchronization or the second synchronization. For example, the first synchronization source and the second synchronization source may include global navigation satellite system (GNSS), base station, or a user equipment (UE). For example, the S-SSB block may include a sidelink primary synchronization signal (S-PSS), a sidelink secondary synchronization signal (S-SSS), and a physical sidelink broadcast channel (PSBCH).

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: select a first synchronization source based on a sidelink synchronization priority; obtain a first synchronization based on the first synchronization source; receive a plurality of synchronization signals from a plurality of synchronization sources; obtain a plurality of synchronizations based on the plurality of synchronization signals; select a second synchronization source among the plurality of synchronization sources, based on a gap between a time related to the first synchronization and a time related to a second synchronization being greater than or equal to a threshold value, wherein the second synchronization is obtained based on the second synchronization source; and transmit a sidelink-synchronization signal block (S-SSB) block to a second device based on the first synchronization or the second synchronization. For example, the first synchronization source and the second synchronization source may include global navigation satellite system (GNSS), base station, or a user equipment (UE). For example, the S-SSB block may include a sidelink primary synchronization signal (S-PSS), a sidelink secondary synchronization signal (S-SSS), and a physical sidelink broadcast channel (PSBCH).

The user equipment (UE) can efficiently perform SL communication.

DESCRIPTION OF EXEMPLARY EMBODIMENTS

Figure 1:
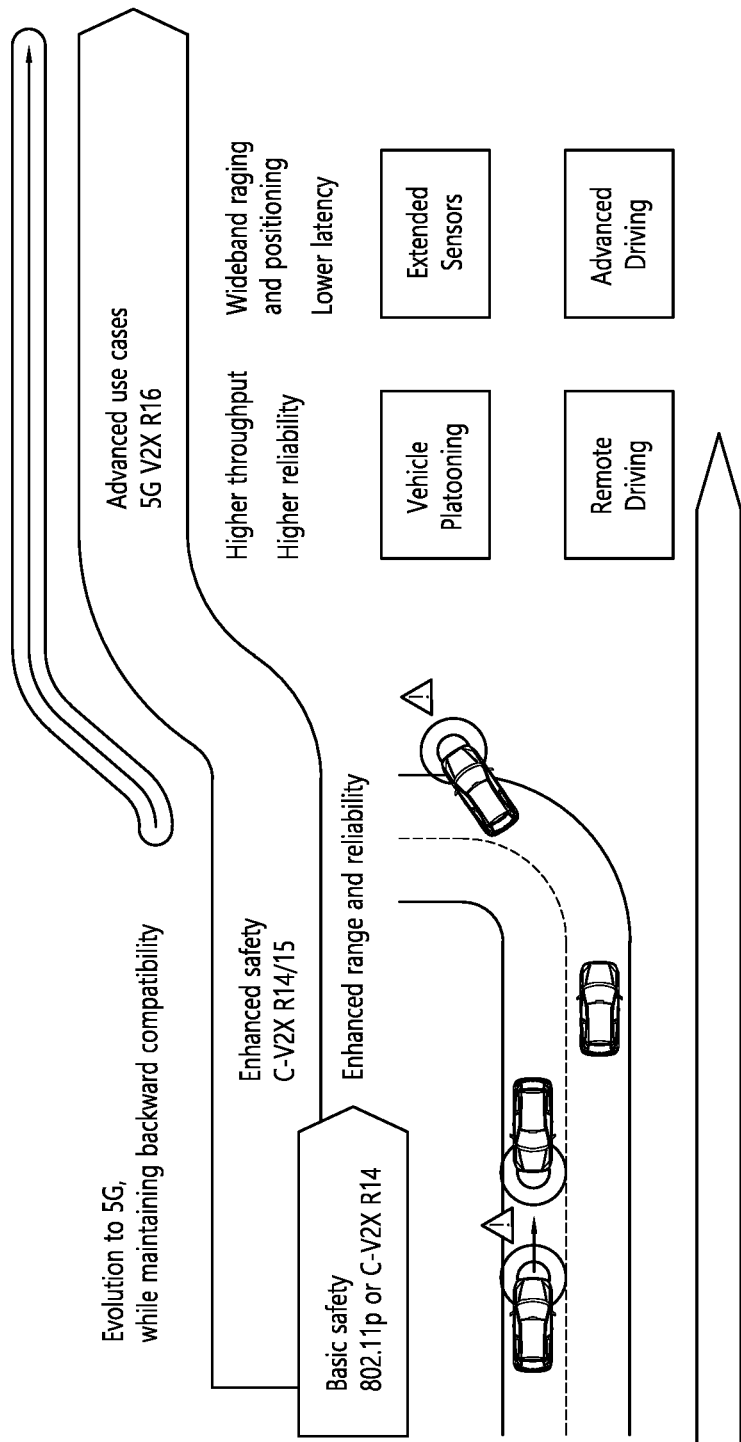
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
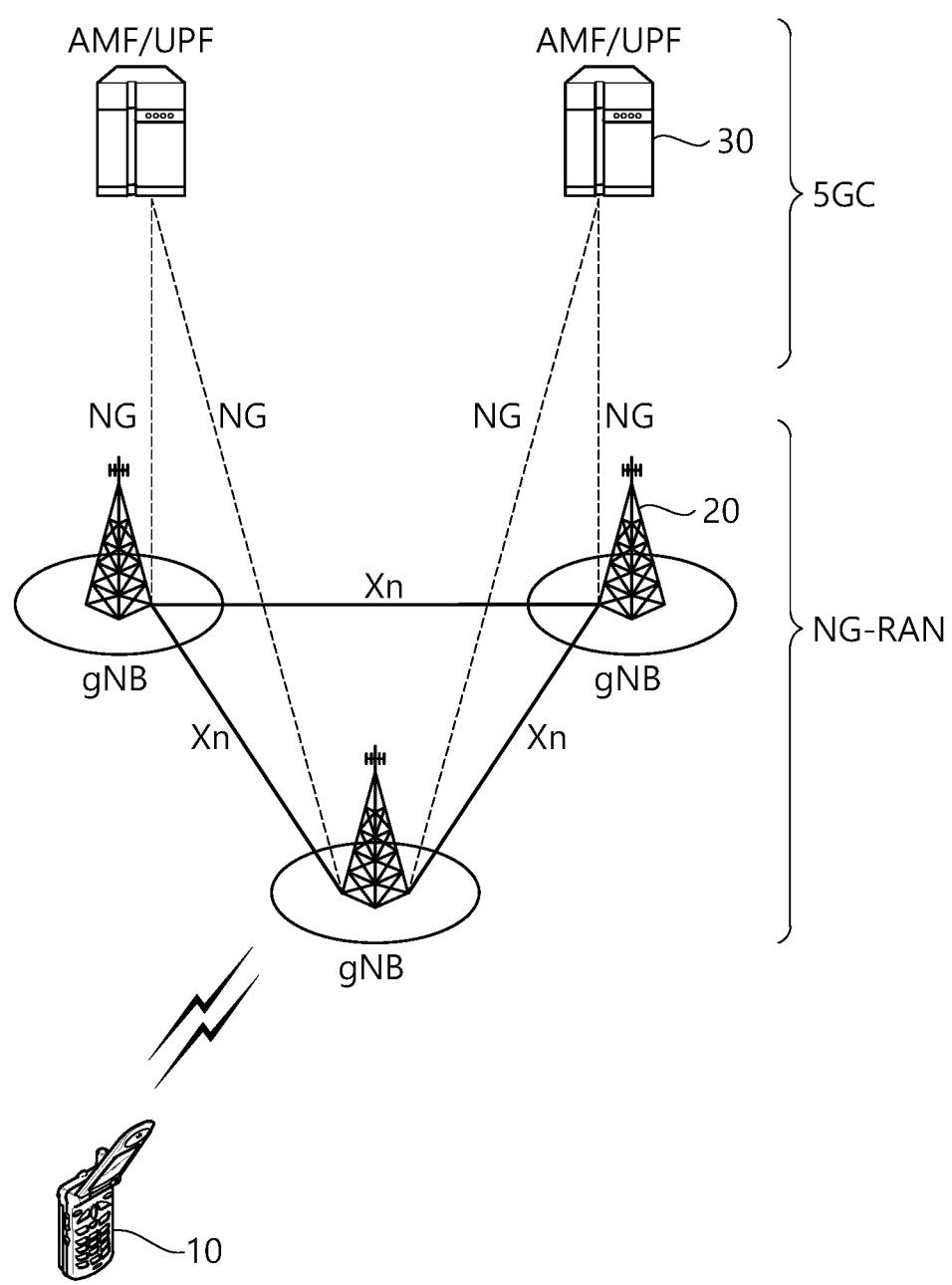
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
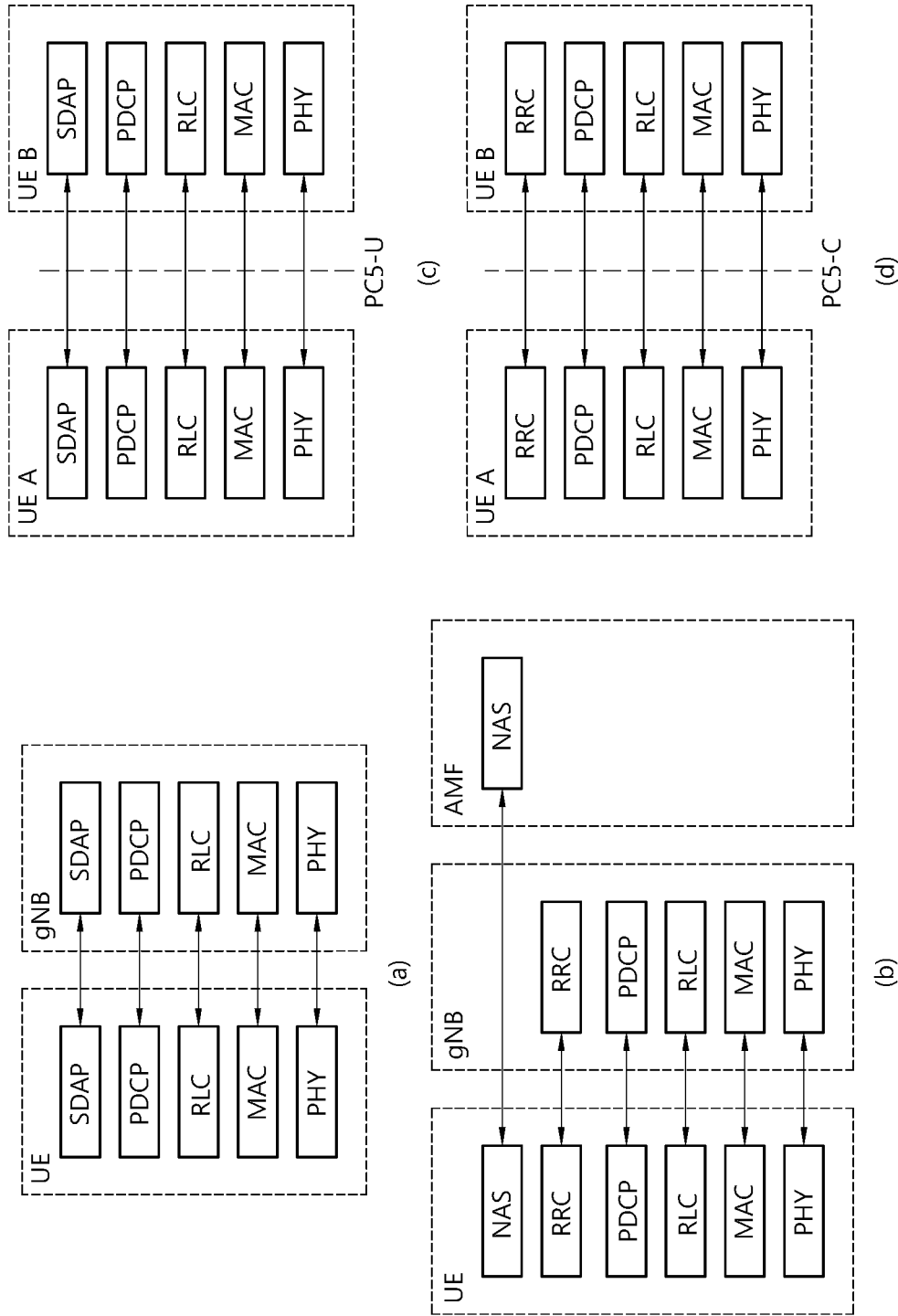
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
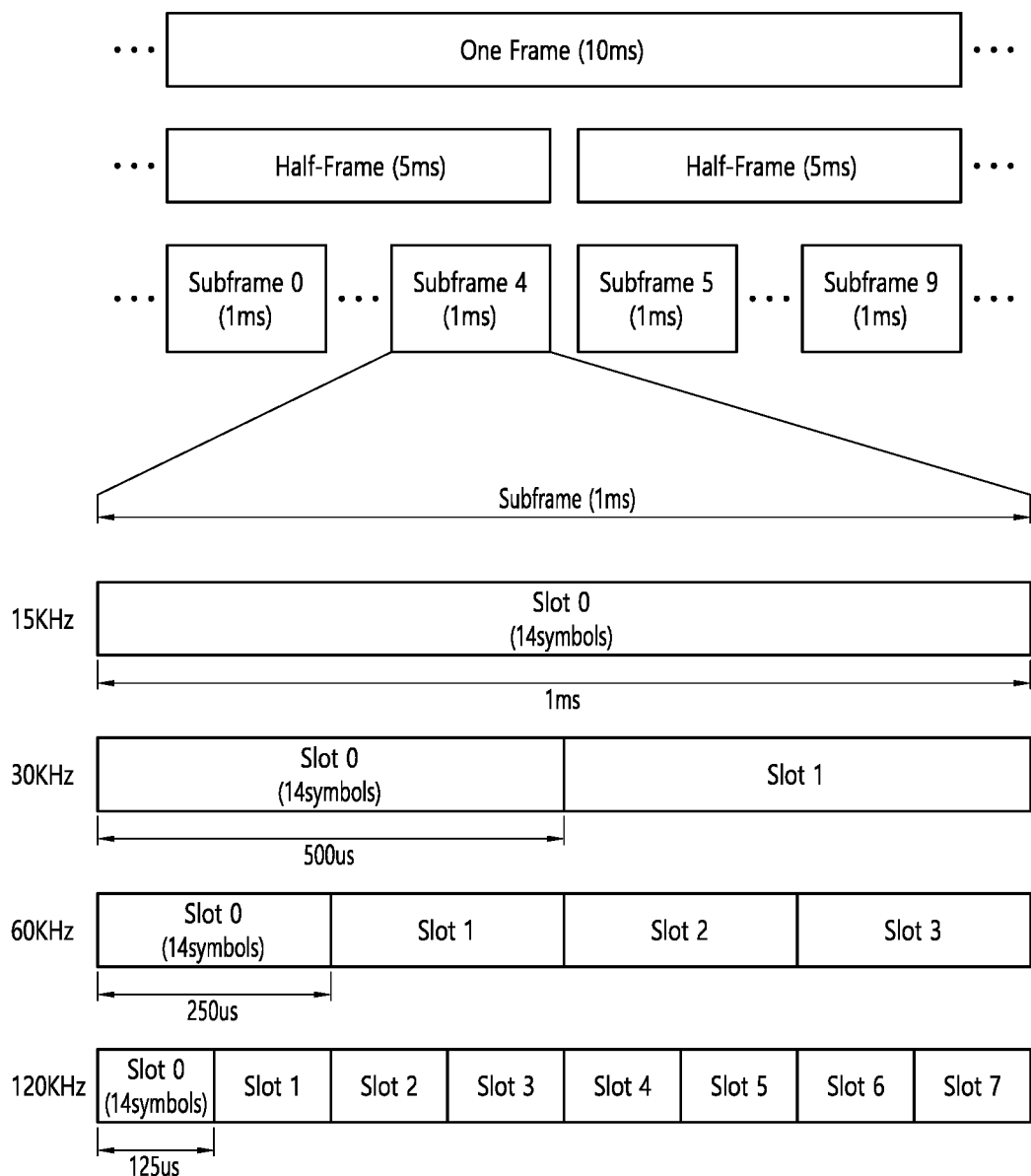
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
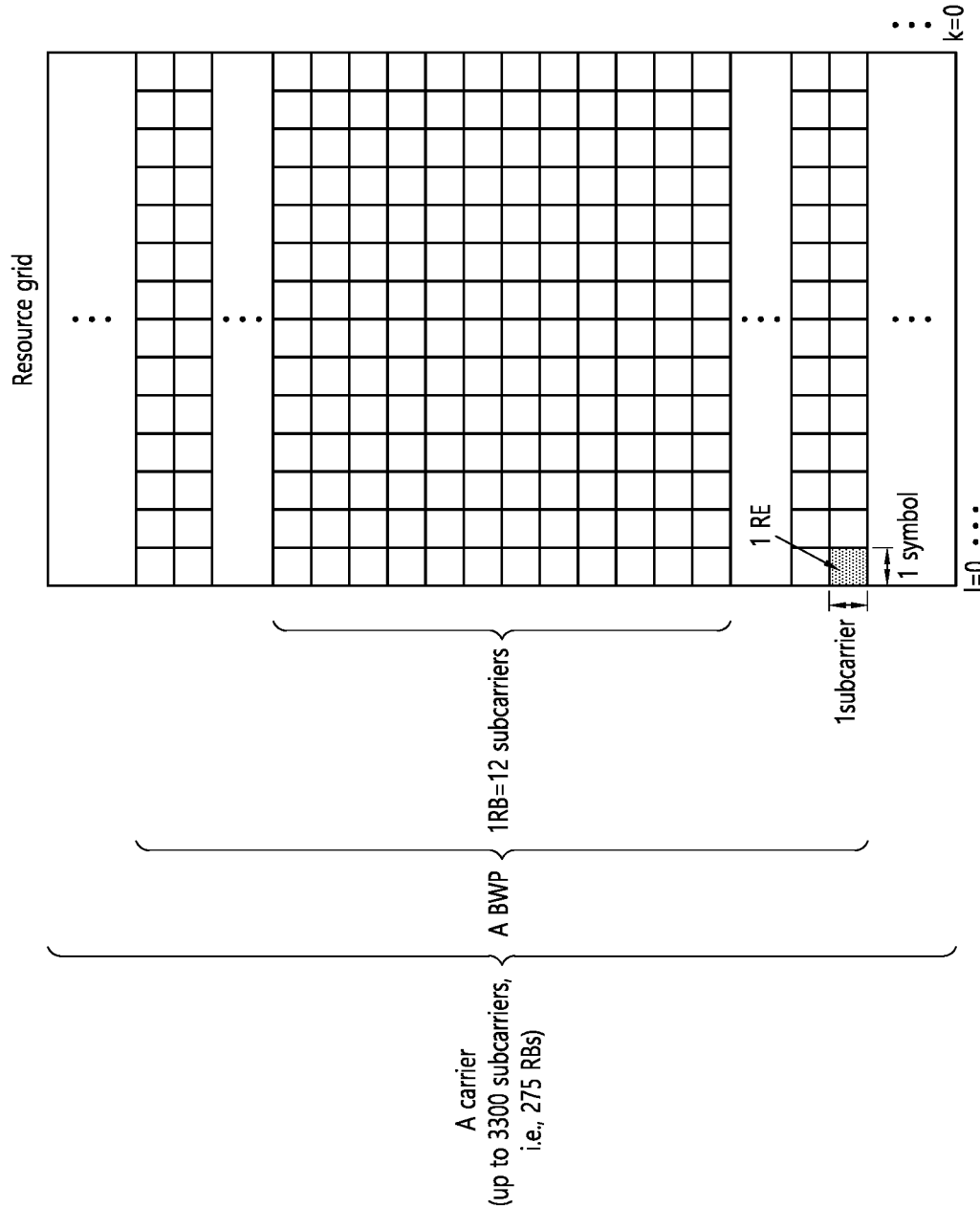
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
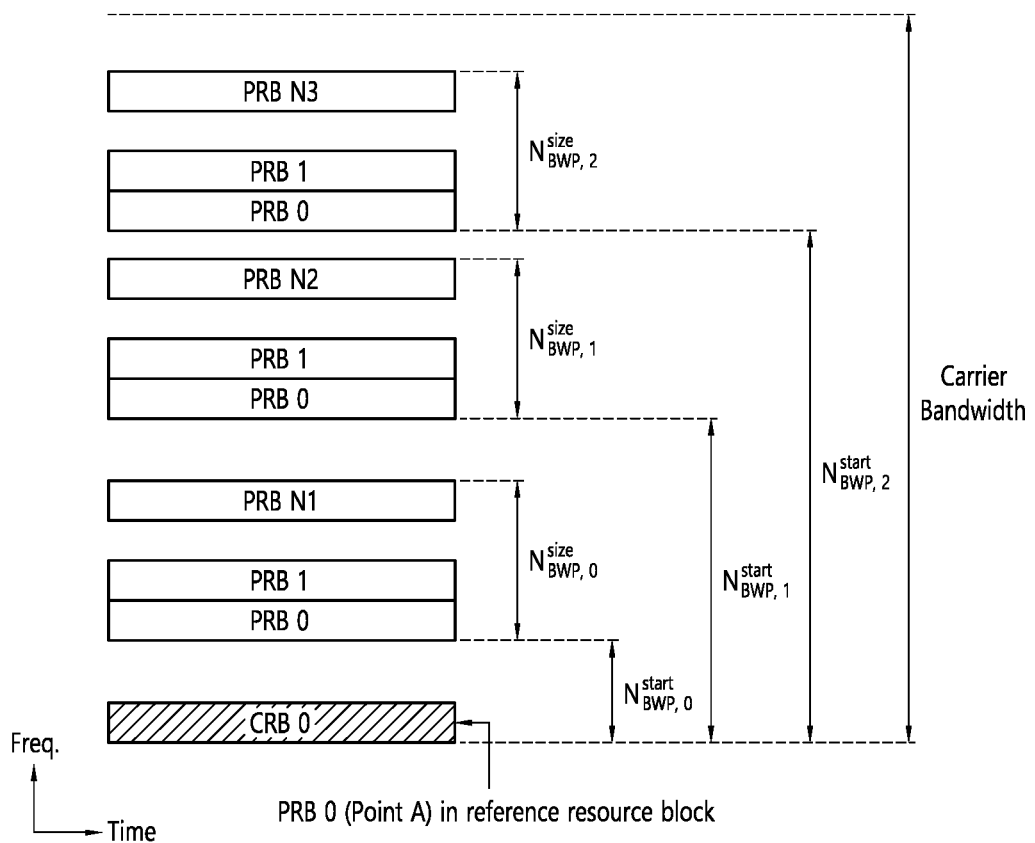
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
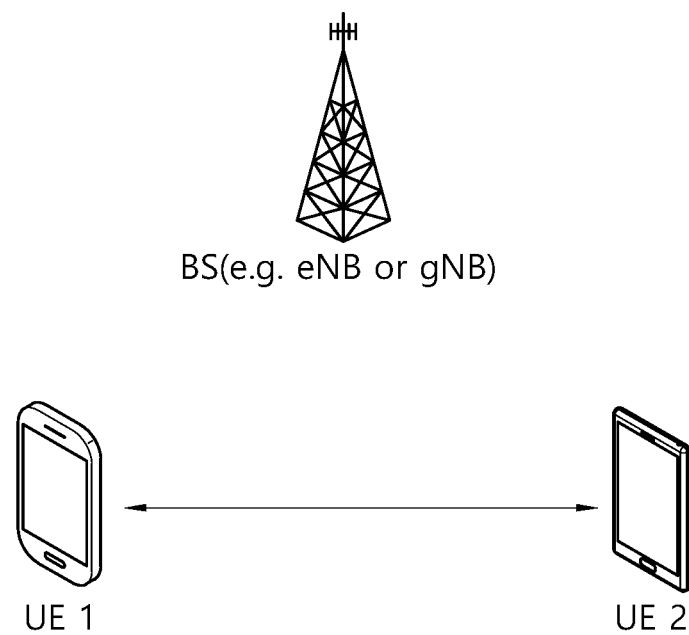
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
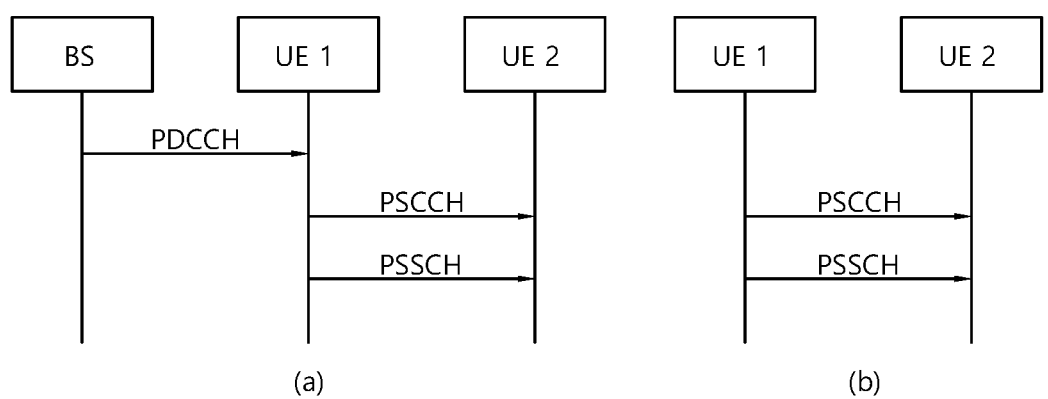
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
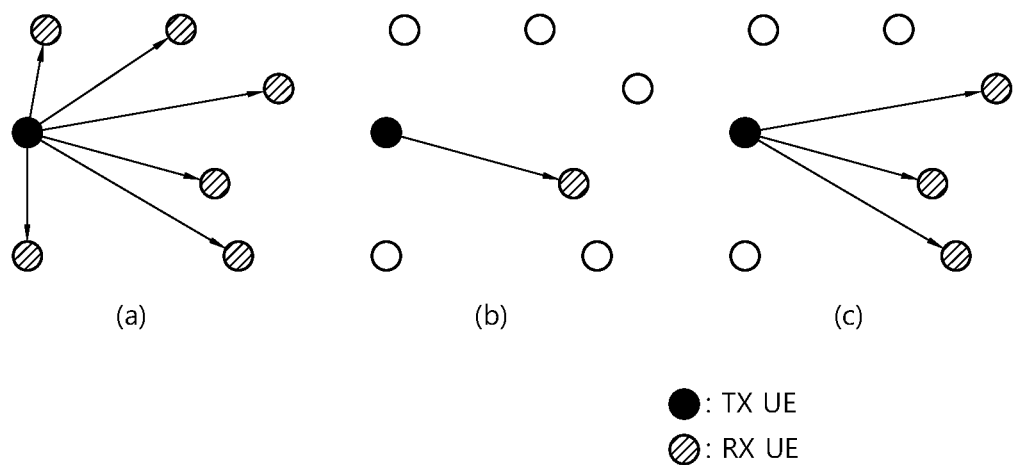
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 10:
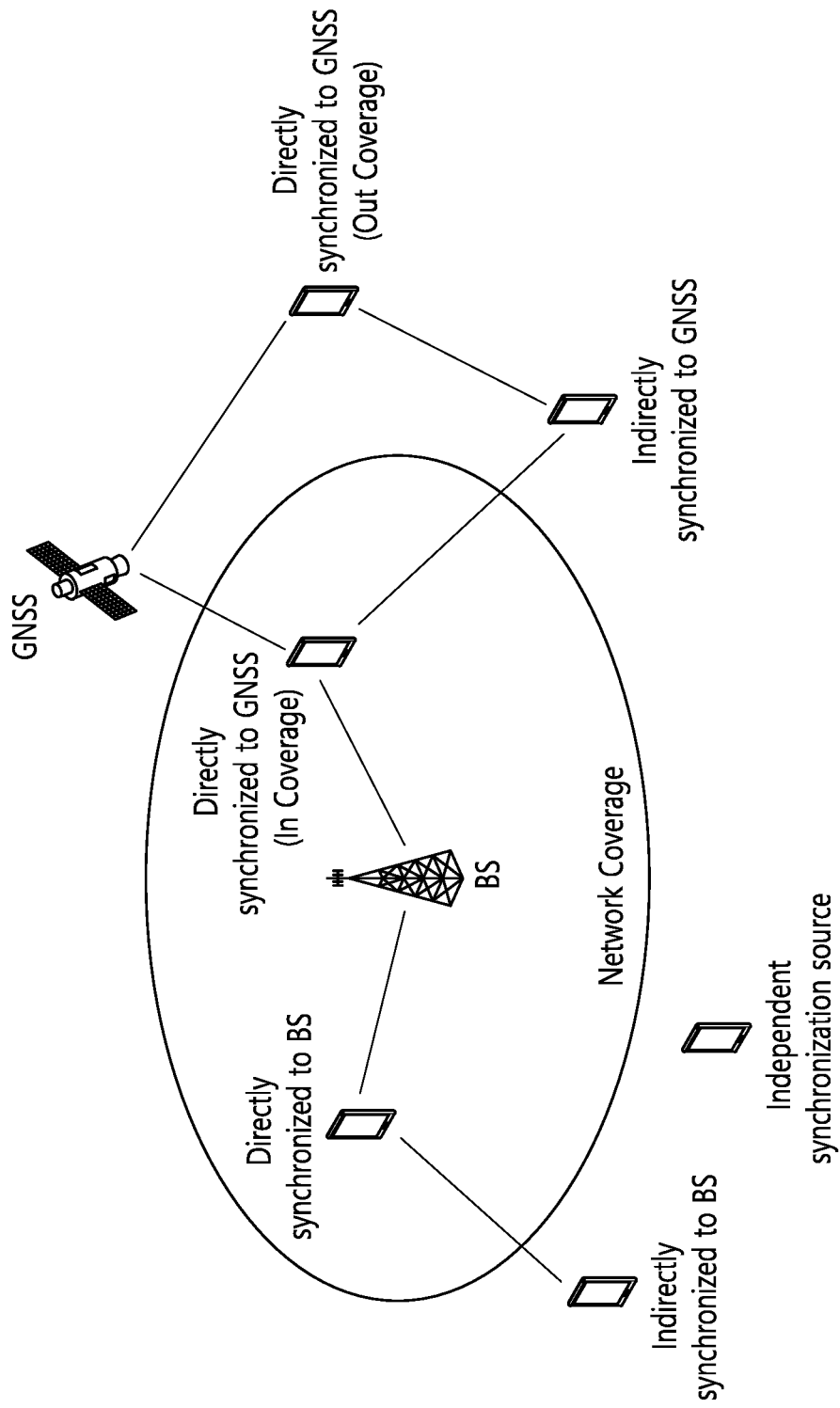
FIG. 10 shows a synchronization source or synchronization reference of V2X according to an embodiment of the present disclosure.

FIG. 10 shows a synchronization source or synchronization reference of V2X according to an embodiment of the present disclosure. The embodiment of FIG. 10 may be combined with various embodiments of the present disclosure.

Referring to FIG. 10, in V2X, a UE may be directly synchronized to global navigation satellite systems (GNSS), or indirectly synchronized to GNSS via a UE that is directly synchronized to GNSS (in network coverage or out of network coverage). When GNSS is configured as a synchronization source, a UE can calculate a DFN and a subframe number using Coordinated Universal Time (UTC) and a (pre)configured Direct Frame Number (DFN) offset.

Alternatively, a UE may be directly synchronized with a base station or synchronized with other UEs that are time/frequency synchronized with the base station. For example, the base station may be an eNB or gNB. For example, when a UE is within network coverage, the UE may receive synchronization information provided by a base station and directly synchronize with the base station. After that, the UE may provide synchronization information to other neighboring UEs. When base station timing is configured as a synchronization reference, for synchronization and downlink measurement, a UE may follow a cell related to a corresponding frequency (when the frequency is within cell coverage), a primary cell, or a serving cell (when the frequency is outside cell coverage).

A base station (e.g., serving cell) may provide synchronization configurations for carriers used for V2X or SL communication. In this case, a UE may follow a synchronization configuration received from a base station. If a UE did not detect any cell on the carrier used for the V2X or SL communication and did not receive synchronization configurations from the serving cell, the UE may follow the pre-configured synchronization configurations.

Alternatively, a UE may be synchronized with other UEs that do not directly or indirectly obtain synchronization information from a base station or GNSS. A synchronization source and preference may be pre-configured for the UE. Alternatively, the synchronization source and preference may be configured through a control message provided by a base station.

A SL synchronization source may be related to a synchronization priority. For example, a relationship between synchronization sources and synchronization priorities may be defined as shown in Table 5 or Table 6. Table 5 or Table 6 is only an example, and the relationship between synchronization sources and synchronization priorities may be defined in various forms.

TABLE 5

| Priority level | GNSS-based synchronization | eNB/gNB-based synchronization |
|---|---|---|
| P0 | GNSS | eNB/gNB |
| P1 | any UE directly synchronized to GNSS | any UE directly synchronized to eNB/gNB |
| P2 | any UE indirectly synchronized to GNSS | any UE indirectly synchronized to eNB/gNB |
| P3 | any other UE | GNSS |
| P4 | N/A | any UE directly synchronized to GNSS |
| P5 | N/A | any UE indirectly synchronized to GNSS |
| P6 | N/A | any other UE |

TABLE 6

| Priority level | GNSS-based synchronization | eNB/gNB-based synchronization |
|---|---|---|
| P0 | GNSS | eNB/gNB |
| P1 | any UE directly synchronized to GNSS | any UE directly synchronized to eNB/gNB |
| P2 | any UE indirectly synchronized to GNSS | any UE indirectly synchronized to eNB/gNB |
| P3 | any other UE | GNSS |
| P4 | any UE directly synchronized to eNB/gNB | any UE directly synchronized to GNSS |
| P5 | any UE indirectly synchronized to eNB/gNB | any UE indirectly synchronized to GNSS |
| P6 | remaining UE(s) with lower priority | remaining UE(s) with lower priority |

In Table 5 or Table 6, P0 may mean the highest priority and P6 may mean the lowest priority. In Table 5 or Table 6, a base station may include at least one of a gNB and an eNB.

Whether to use GNSS-based synchronization or base station-based synchronization may be (pre-)configured. In single-carrier operation, a UE may derive its transmission timing from an available synchronization reference having the highest priority.

On the other hand, in sidelink communication, a user equipment (UE) may select a final synchronization source from among neighboring synchronization sources (e.g., GNSS, gNB/eNB, RSU, UE, etc.) in consideration of a priority according to a synchronization (re)selection rule. Here, for example, a synchronization selection rule may include a synchronization reselection rule. For example, a synchronization selection rules may be pre-configured or configured for a UE by network. For example, a synchronization selection rule may include a relationship between a synchronization source and a synchronization priority (e.g., sidelink synchronization priority). For example, a synchronization reference may include a synchronization source or a synchronization reference source. For example, a synchronization reference source may be a synchronization source that is a synchronization reference. For example, a synchronization reference source may be replaced with a synchronization source. At this time, for example, a UE may use broadcast, group cast, unicast, etc. as a V2X cast type according to the type of V2X service. For example, UEs related to a corresponding service may use different synchronization timings according to each cast type. Or, for example, when a synchronization selection rule configured between a base station coverage UE (in-coverage UE, INC UE) and a base station out-of-coverage UE (out-of-coverage UE, OOC UE) are different, INC UE and OOC UE may use different synchronization timings. Or, for example, when neighboring synchronization sources that UEs can recognize are different, sidelink communication between UEs may be impossible.

In the present disclosure, a method for solving a problem in which sidelink communication between UEs is impossible as UEs use different synchronization timings as described above will be described. For example, to solve the above problem, a UE may select multiple different synchronization reference sources and maintain multiple different synchronization timings. For example, by maintaining a number of different synchronization timings like this, even if the synchronization timing currently used between UEs is different, by switching to the different synchronization timings, a UE may perform sidelink communication between UEs.

According to an embodiment of the present disclosure, a UE may select one or more synchronization reference sources according to a synchronization selection rule in which synchronization timing of a base station such as a gNB/eNB is given the highest priority. At this time, for example, a UE may simultaneously select one or more other synchronization reference sources according to a synchronization selection rule that configures the synchronization timing of GNSS as the highest priority. Here, for example, synchronization selection rules may be configured in a UE by network. As a result, in particular, by INC UEs synchronized with the synchronization timing of a base station and OOC UEs synchronized with the synchronization timing of GNSS selecting the same synchronization timing (for example, the synchronization timing of a base station of a synchronization timing of GNSS), INC UEs and OOC UEs may perform sidelink communication.

According to an embodiment of the present disclosure, a UE may select not a synchronization source with the highest priority according to a synchronization selection rule configured for itself, but a synchronization source according to another synchronization selection rule in which other synchronization source has the highest priority as one of multiple synchronization reference sources that the UE must maintain. For example, a UE with synchronization selection rules that give GNSS the highest priority may preferentially select a synchronization reference source according to another synchronization selection rule which gives a base station such as a gNB/eNB the highest priority (e.g., a UE synchronized directly with a gNB/eNB, a UE synchronized indirectly with a gNB/eNB) as a synchronization reference source. Alternatively, for example, a UE for which a synchronization selection rule is configured in which a base station such as gNB/eNB is given the highest priority may preferentially select a synchronization reference source according to another synchronization selection rule which gives GNSS the highest priority (e.g., a UE synchronized with GNSS directly, a UE synchronized with GNSS indirectly) as a synchronization reference source. For example, information regarding which synchronization reference source of the highest priority is preferentially selected as multiple synchronization reference sources or information regarding which synchronization reference source is preferentially selected as multiple synchronization reference sources may be pre-configured for a UE. For example, information regarding which synchronization reference source of the highest priority is preferentially selected as multiple synchronization reference sources or information regarding which synchronization reference source is preferentially selected as multiple synchronization reference sources may be pre-configured or configured for a UE through higher layer signaling from network. Alternatively, for example, information regarding which synchronization reference source of the highest priority is preferentially selected as multiple synchronization reference sources or information regarding which synchronization reference source is preferentially selected as multiple synchronization reference sources may be signaled to a UE through a MAC CE or DCI from a base station.

According to an embodiment of the present disclosure, when a UE selects a plurality of different synchronization timings, a UE may select a synchronization reference source in which a timing gap between a synchronization timing of multiple previously selected synchronization reference sources and multiple synchronization signals (e.g., SLSS or SL signals) newly received is greater than or equal to a specific threshold as one of multiple synchronization reference sources. Or, for example, when a UE selects multiple different synchronization timings, a UE may not select a synchronization reference source in which a timing gap between a synchronization timing of multiple previously selected synchronization reference sources and multiple synchronization signals (e.g., SLSS or SL signals) newly received is less than a specific threshold. For example, when the UE selects multiple different synchronization timings, a UE may add a synchronization reference source whose timing gap with the synchronization timing of the previously selected synchronization reference source is greater than or equal to a threshold value as one of a plurality of synchronization reference sources. At this time, for example, the threshold value may be pre-configured or configured to a UE through higher layer signaling from network. Or, for example, the threshold value may be signaled from a base station to a UE through a MAC CE or DCI. Or, for example, the threshold value may be a ratio (e.g., 25%, 50%, 100%, 200% of cyclic prefix, etc.) to cyclic prefix based on sidelink numerology. Or, for example, the threshold value may be a ratio to a duration of a sidelink symbol, a duration of a sidelink slot, a duration of a sidelink subframe, or a duration of a sidelink frame. Alternatively, for example, which criterion and which ratio are to be used as the criterion among the above-described durations may be predefined. For example, information regarding the criterion and ratio for the above-described duration may be pre-configured or configured to a UE through higher layer signaling from network. For example, information regarding the criterion and ratio for the above-described duration may be signaled from a base station to a UE through a MAC CE or DCI. Or, for example, the threshold value may be an absolute time value (e.g., microseconds, milliseconds) or a ratio of an absolute time value. Because of this, by selecting a plurality of synchronization reference sources with a synchronization timing greater than or equal to a specific timing gap, a UE can perform sidelink communication with UEs with different synchronization timings based on the selected synchronization timings.

According to an embodiment of the present disclosure, based on information regarding synchronization reference source transmitted by a counterpart UE or neighboring UEs, a UE may select a synchronization reference source used by the counterpart UE or neighboring UEs among synchronization reference sources related to synchronization timing with a timing gap equal to or greater than the above-mentioned threshold value as any one of many sources of synchronization references it need to maintain.

According to an embodiment of the present disclosure, a UE may select a synchronization reference source exceeding a specific priority level based on a synchronization selection rule among synchronization reference sources related to synchronization timing with a timing gap equal to or greater than the aforementioned threshold value as one of multiple synchronization reference sources it should maintain. For example, a synchronization selection rule may be configured in a UE by network. For example, priority level may be pre-configured or configured to a UE through higher layer signaling from network. Or, for example, priority level may be signaled from a base station to a UE through a MAC CE or DCI. Alternatively, a UE may select only a synchronization criteria source that has a priority higher than or equal to the priority of the synchronization criteria source used by itself as one of multiple synchronization reference sources it needs to maintain.

According to an embodiment of the present disclosure, for UEs with a synchronization reference source (e.g., GNSS or eNB/gNB) of the highest priority different from its own, a UE may select the synchronization reference sources of the target UEs as one of multiple synchronization sources. Alternatively, for example, among UEs with the same synchronization reference source with the highest priority with itself, for UEs with synchronization selection rules different from its own synchronization selection rule, a UE may select the synchronization reference sources of the target UEs as one of multiple synchronization sources.

According to an embodiment of the present disclosure, based on information regarding a synchronization reference source transmitted by a counterpart UE or neighboring UEs among synchronization reference sources related to synchronization timing with a timing gap equal to or greater than the aforementioned threshold, if the priority of the synchronization reference source used by the counterpart UE or neighboring UEs is higher than or equal to the priority of the synchronization reference source used by a UE, the UE may select the synchronization reference source used by counterpart UEs or neighboring UEs as one of multiple synchronization reference sources it needs to maintain. That is, a UE may determine whether the priority of a synchronization reference source used by a counterpart UE or neighboring UEs among the synchronization reference sources related to synchronization timing with a timing gap equal to or greater than the aforementioned threshold is higher than or equal to the priority of a synchronization reference source used by the UE, based on information regarding the synchronization reference source transmitted by the counterpart UE or neighboring UEs. At this time, if the priority is higher than or equal to the priority of the synchronization reference source used by a UE itself, the UE may select a synchronization reference source used by a counterpart UE or neighboring UEs as one of a plurality of synchronization reference sources it needs to maintain.

According to an embodiment of the present disclosure, when a UE selects a plurality of different synchronization timings, the UE may select up to a specific number of synchronization reference sources. For example, when a UE selects synchronization reference sources with different synchronization timings according to at least one of the above-described timing gap or the above-described priority of synchronization sources, the UE may select up to a specific number of synchronization reference sources. For example, a UE may not select a synchronization reference source exceeding a specific number. For example, a specific number may be predefined. For example, a specific number may be pre-configured or configured to a UE through higher layer signaling from network. Or, for example, a specific number may be signaled from a base station to a UE through a MAC CE or DCI.

According to an embodiment of the present disclosure, a UE may transmit information related to a synchronization reference source used by the UE or information regarding a priority of a synchronization reference source used by the UE to neighboring UEs or counterpart UEs. For example, information related to a synchronization reference source or information regarding a priority of the synchronization reference source may be transmitted through S-PSS, S-SSS, or PSBCH in an S-SSB. Alternatively, for example, information related to a synchronization reference source or information regarding a priority of the synchronization reference source may be transmitted through a PSCCH/PSSCH or a PSFCH. Alternatively, for example, information related to a synchronization reference source or information regarding a priority of the synchronization reference source may be transmitted through a MAC CE. Alternatively, for example, information related to a synchronization reference source or information regarding a priority of the synchronization reference source may be transmitted through sidelink higher layer signaling such as PC-5 RRC. Alternatively, for example, information related to a synchronization reference source or information regarding a priority of the synchronization reference source may be transmitted through a PSBCH CMRS, a PSCCH DMRS or a PSSCH DMRS. Alternatively, for example, information related to a synchronization reference source or information regarding a priority of the synchronization reference source may be transmitted through a reference signal such as a PT-RS, CSI-RS, etc. Alternatively, for example, information related to a synchronization reference source or information regarding a priority of the synchronization reference source may be transmitted through a sequence such as Orthogonal Cover Code (OCC) that can be additionally applied to a DMRS. Alternatively, for example, information related to a synchronization reference source or information regarding a priority of the synchronization reference source may be transmitted through temporary indication signal used for SL communication, such as SL-RNTI.

According to an embodiment of the present disclosure, a UE may preferentially select a synchronization reference source with a cast type different from that used for sidelink communication as one of a plurality of synchronization reference sources. For example, a UE performing unicast communication may preferentially select a UE performing broadcast or groupcast communication as one of a plurality of synchronization reference sources. For example, a UE performing unicast communication may preferentially select synchronization reference source used by a UE performing broadcast or groupcast communication as one of a plurality of synchronization reference sources. Alternatively, for example, a UE performing broadcast communication may preferentially select a UE performing unicast or groupcast communication as one of a plurality of synchronization reference sources. For example, a UE performing broadcast communication may preferentially select a synchronization reference source used by a UE performing unicast or groupcast communication as one of a plurality of synchronization reference sources. Alternatively, for example, since broadcast communication is often used for basic safety, a UE may preferentially select a UE performing broadcast communication as one of a plurality of synchronization reference sources. For example, a UE may preferentially select a synchronization reference source used by a UE performing broadcast communication as one of a plurality of synchronization reference sources. Or, for example, since broadcast communication is often used for basic safety, a UE may preferentially select a UE performing unicast or groupcast communication as one of a plurality of synchronization reference sources. Alternatively, for example, a priority of which cast type should be selected first may be predefined. For example, a priority of which cast type should be selected first may be pre-configured or configured for a UE through higher layer signaling from network. For example, a priority of which cast type should be selected first may be signaled from a base station to a UE through a MAC CE or DCI. For example, a priority related to the cast type may be pre-configured or configured to a UE through higher layer signaling from network. For example, a priority related to the cast type may be signaled from a base station to a UE through a MAC CE or DCI.

According to an embodiment of the present disclosure, according to at least one of QoS, priority, packet delay budget, reliability, or distance of a service transmitted by a UE through sidelink communication, the UE may select a neighboring synchronization reference source as one of a plurality of synchronization reference sources. For example, a UE may select a synchronization reference source used by a UE with a high QoS of service as one of a plurality of synchronization reference sources from among neighboring synchronization reference sources. Alternatively, for example, a UE may select a synchronization reference source used by a UE with a high QoS of service as one of a plurality of synchronization reference sources from among neighboring synchronization reference sources. Alternatively, for example, a UE may select a synchronization reference source used by a UE with a higher service priority among neighboring synchronization reference sources as one of a plurality of synchronization reference sources. Alternatively, for example, a UE may select a synchronization reference source used by a UE with a short packet delay budget as one of a plurality of synchronization reference sources from among neighboring synchronization reference sources. Alternatively, for example, a UE may select a synchronization reference source used by a UE with high reliability as one of a plurality of synchronization reference sources among neighboring synchronization reference sources. Alternatively, for example, a UE may select a synchronization reference source used by a UE with a shorter distance as one of a plurality of synchronization reference sources among neighboring synchronization reference sources.

For example, a UE may measure RSRP or RSSI for S-SSB, PSCCH, PSSCH, PSFCH, etc. transmitted by neighboring synchronization reference sources, and may consider a synchronization reference source with a higher RSRP or RSSI as having higher reliability. For example, a UE may select a synchronization reference source with a high RSRP or RSSI for the S-SSB, PSCCH, PSSCH, and PSFCH among neighboring synchronization reference sources as one of a plurality of synchronization reference sources. Alternatively, for example, a UE may select a synchronization reference source with an RSRP or RSSI higher than the RSRP or RSSI related to a plurality of synchronization reference sources selected by it from among neighboring synchronization reference sources as one of a plurality of synchronization reference sources. Alternatively, for example, a UE may select a synchronization reference source in which the difference between the RSRP or RSSI values for the S-SSB, PSCCH, PSSCH, and PSFCH transmitted by neighboring synchronization reference sources and the RSRP or RSSI values related to the plurality of synchronization reference sources selected by itself is within a specific range among neighboring synchronization reference sources as one of a plurality of synchronization reference sources. Alternatively, for example, a UE may select a synchronization reference source whose RSRP or RSSI for S-SSB, PSCCH, PSSCH, or PSFCH transmitted by neighboring synchronization reference sources is greater than or equal to a threshold value among neighboring synchronization reference sources as on of a plurality of synchronization reference sources. For example, the threshold value may be pre-configured or configured to a UE through higher layer signaling from network. Or, for example, the threshold value may be signaled from a base station to a UE through a MAC CE or DCI.

In the present disclosure, a method for selecting a plurality of synchronization reference sources in order for a UE to maintain a plurality of synchronization timings has been proposed.

A UE (e.g., SL UE or V2X UE) may select a final synchronization source from among neighboring synchronization sources (e.g., GNSS, gNB/eNB, RSU, UE, etc.), considering a priority according to a synchronization (re) selection rule pre-configured or configured by network. In this specification, a synchronization source may be referred to as a synchronization reference. At this time, a UE may perform SL communication using a cast type such as broadcast, group cast, or unicast according to the type of V2X service, and the UE may use different synchronization timings between UEs related to a corresponding service according to each cast type. For example, when a synchronization (re)selection rules configured between an in-coverage UE and an out-coverage UE are different, or neighboring synchronization sources that can be recognized among the UEs are different, respectively, a case in which SL communication is impossible between UEs may occur. Accordingly, in order to perform SL communication with neighboring UEs using different synchronization timings, a UE may select and maintain multiple different synchronization timings. That is, a UE may obtain/select synchronization timing from different synchronization criteria, and the UE may maintain the obtained/selected synchronization timing.

According to various embodiments of the present disclosure, when the UE selects and maintains a plurality of different synchronization timings, a method for efficiently performing PSFCH transmission for SL HARQ feedback transmission between different UEs and a device supporting the same are proposed.

According to an embodiment of the present disclosure, when UE-A and UE-B perform SL communication requiring SL HARQ feedback transmission such as unicast communication or groupcast communication, UE-B which has received a PSCCH/PSSCH transmitted by UE-A may transmit a PSFCH (e.g., HARQ feedback) to the UE-A using a PSFCH resource related to the timing or resource location at which the PSCCH/PSSCH was received.

Figure 11:
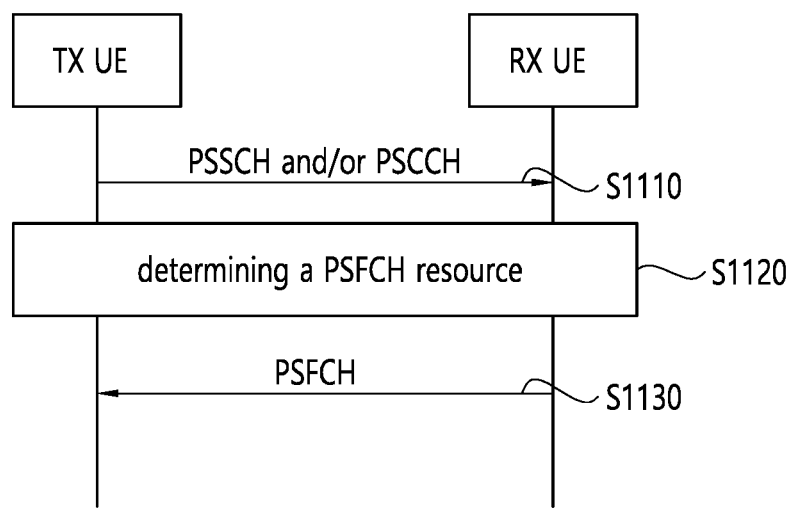
FIG. 11 shows a procedure for transmitting and receiving HARQ feedback according to an embodiment of the present disclosure.

FIG. 11 shows a procedure for transmitting and receiving HARQ feedback according to an embodiment of the present disclosure. The embodiment of FIG. 11 may be combined with various embodiments of the present disclosure.

In this specification, for convenience of description, a UE transmitting a PSSCH and or a PSCCH may be referred to as a transmitting UE or a TX UE, a UE transmitting a PSFCH in response to a PSSCH and/or a PSCCH may be referred to as a receiving UE or an RX UE.

Referring to FIG. 11, in step S1110, a TX UE may transmit a PSSCH and/or PSCCH to an RX UE.

In step S1120, a TX UE and/or an RX UE may determine a PSFCH resource related to a PSSCH and/or a PSCCH. For example, a PSFCH resource may be a resource used for transmission and reception of HARQ feedback.

For example, a TX UE and/or RX UE may determine one or more PSFCH resources related to sub-channels for PSSCH and slots for PSSCH. Here, a PSFCH resource may be in a resource block (RB) unit. And, a TX UE and/or an RX UE may determine the number of available PSFCH resources for multiplexing HARQ feedback based on the number of cyclic shift pairs for a resource pool. And, a TX UE and/or an RX UE may determine a (final) PSFCH resource for transmitting and receiving HARQ feedback based on at least one of an ID of a TX UE and/or an ID of an RX UE.

In step S1130, an RX UE may transmit HARQ feedback using a determined PSFCH resource, and a TX UE may receive HARQ feedback on a determined PSFCH resource.

Tables 7 and 8 describe in detail a procedure for transmitting and receiving HARQ feedback by a UE.

TABLE 7

16.3 UE procedure for reporting HARQ-ACK on sidelink

A UE can be indicated by an SCI format scheduling a PSSCH reception,
in one or more sub-channels from a number of $N^{PSSCH}_{subch}$ sub-channels, to
transmit a PSFCH with HARQ-ACK information in response to the
PSSCH reception. The UE provides HARQ-ACK information that
includes ACK or NACK, or only NACK.
A UE can be provided by periodPSFCHresource, a number of slots
in a resource pool for a period of PSFCH
transmission occasion resources. If the number is zero, PSFCH
transmissions from the UE in the resource pool are disabled.
A UE may be indicated by higher layers to not transmit a PSFCH
in response to a PSSCH reception [11. TS 38.321].
If a UE receives a PSSCH in a response pool and a ZYX field in a SCI
format 0_2 scheduling the PSSCH reception idicates to the UE to repeat
HARQ-ACK information for the PSSCH reception [5. TS 38.212], the UE
provides the HARQ-ACK information in a PSFCH transmission
in the resource pool. The UE transmits the PSFCH in a first slot that includes
PSFCH resources and is at least a number of slots, provided by
MinTimeGapPSFCH, of the resource pool after
a last slot of the PSSCH reception.
A UE is provided by rbSetPSFCH a set of $N^{PSFCH}_{PRB,set}$
PRBs in a resource pool for PSFCH transmission
is a PRB of the resource pool. For a number of $N_{subch}$ sub-channels for the
resource pool, provided by minSubchannel, and a number of
$N^{PSFCH}_{PSSCH}$ PSSCH slots associated with a PSFCH that, provided by
periodPSFCHresource, the UE allocates the
$[(i + j \cdot N^{PSFCH}_{PSSCH}) \cdot M^{PSFCH}_{subch, slot} (i + 1 + j \cdot N^{PSFCH}_{PSSCH}) \cdot M^{PSFCH}_{subch, slot} - 1]$
PRBs from the $M^{PSFCH}_{PRB, set}$ PRBs to slot i and sub-
channel j where $M^{PSFCH}_{subch, slot} = M^{PSFCH}_{PRB, set}/(N_{subch} \cdot N^{PSFCH}_{PSSCH})$, $0 \le i < N^{PSFCH}_{PSSCH}$ $0 \le$
$j < N_{subch}$, and the allocation starts in
an ascending order of i and continues in an ascending order of j. The UE
expects that $M^{PSFCH}_{PRB, se}$ is a multiple of $N_{subch} \cdot N^{PSFCH}_{PSSCH}$
A UE determines a number of PSFCH resources available for multiplexing
HARQ-ACK information in a PSFCH transmission as $R^{PSFCH}_{PRB, CS} =$ TABLE 7-continued 16.3 UE procedure for reporting HARQ-ACK on sidelink $N^{PSFCH}_{type} \cdot M^{PSFCH}_{subch, slot} \cdot N^{PSFCH}_{CS}$ where $N^{PSFCH}_{CS}$ is a number of cyclic shift pairs for the resource pool and, based on an indication by higher layers.
$N^{PSFCH}_{type} = 1$ and the $M^{PSFCH}_{subch, slot}$ PRBs are associated with the starting sub-channel of the corresponding PSSCH
$N^{PSFCH}_{type} = N^{PSSCH}_{subch}$ and the $N^{PSSCH}_{subch} \cdot M^{PSFCH}_{subch, slot}$ PRBs are associated with one or more sub-channels from the $N^{PSSCH}_{subch}$ sub-channels of the corresponding PSSCH

TABLE 8

The PSFCH resources are first indexed according to an ascending order of the PRB index, from the $N^{PSFCH}_{type} \cdot M^{PSFCH}_{subch, slot}$ PRBs, and then according to an ascending order of the cyclic shift pair index from the $N^{PSFCH}_{CS}$ cyclic shift pairs.
A UE determines an index of a PSFCH resource for a PSFCH transmission in response to a PSSCH reception, as $(P_{ID} + M_{ID}) \mod R^{PSFCH}_{PRB, CS}$ where $P_{ID}$ is a physical layer source ID provided by SCI format 0_2 [5, TS 38.212] scheduling the PSSCH reception, $M_{ID}$ is zero or $M_{ID}$ is the identity of the UE receiving the PSSCH as indicated by higher layers.
A UE determines a $m_0$ value, for computing a value of cyclic shift α [4, TS 38.211], from a cyclic shift pair index corresponding to a PSFCH resource index and from $N^{PSFCH}_{CS}$ using Table 16.3-1.

Table 16.3-1: Set of cyclic shift pairs

| | $m_0$ | | | | | |
|---|---|---|---|---|---|---|
| $N^{PSFCH}_{CS}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as in Table 16.3-2 or Table 16.3-3 as indicated by a SCI format scheduling a PSSCH reception. The UE applies one cyclic shift from a cyclic shift pair to a sequence used for the PSFCH transmission [4, TS 38.211].
Table 16.3-2: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | N/A |

In the above case, a UE may receive a PSCCH/PSSCH from multiple UEs. In this case, a UE may transmit multiple PSFCHs by multiplexing them in the time and/or frequency domain, considering additionally information related to the slot and subchannel through which a PSCCH/PSSCH is received from each UE, a source ID, a destination ID, a layer-1/layer-2 ID, a groupcast member ID, etc. of each UE.

In the above case, it is assumed that UE-A and UE-B use different SL resource pools and that UE-A and UE-B use different synchronization timings. In this case, UE-A and UE-B cannot know the reception timing and resource location of the PSCCH/PSSCH transmitted or received by the other UE, and the location of the PSFCH determined based on the IDs. Therefore, when a UE receives a PSFCH from a UE using different synchronization timing, the UE must perform blind detection for all possible PSFCH reception locations. Therefore, reception complexity of a UE may be greatly increased, or HARQ feedback by PSFCH may become difficult.

In order to solve the above problems, a UE may configure (i) a reception area of a PSFCH transmitted by another UE performing SL communication using the same synchronization timing as its own synchronization timing and (ii) a reception area of a PSFCH transmitted by another UE performing SL communication using synchronization timing different from the synchronization timing used by the UE separately from each other in the time domain and/or frequency domain. For example, a UE may configure (i) a reception area of a PSFCH transmitted by another UE performing SL communication using the same synchronization timing as its own synchronization timing and (ii) a reception area of a PSFCH transmitted by another UE performing SL communication using synchronization timing different from the synchronization timing used by the UE separately from each other in the code domain and/or the sequence domain.

According to an embodiment of the present disclosure, in order for a UE to receive a PSFCH from UEs using different synchronization timing, the UE may configure PSFCH regions for receiving PSFCHs from UEs using different synchronization timings to different symbols in the each of time domain. For example, in order for a UE to receive a PSFCH from UEs using different synchronization timing, the UE may configure PSFCH regions for receiving PSFCHs from UEs using different synchronization timings to different subframes in the each of time domain. For example, in order for a UE to receive a PSFCH from UEs using different synchronization timing, the UE may configure PSFCH regions for receiving PSFCHs from UEs using different synchronization timings to different frames in the each of time domain.

For example, in order for a UE to receive a PSFCH from UEs using different synchronization timing, the UE may configure PSFCH regions for receiving PSFCHs from UEs using different synchronization timings to different resource elements (REs) in the each of frequency domain. For example, in order for a UE to receive a PSFCH from UEs using different synchronization timing, the UE may configure PSFCH regions for receiving PSFCHs from UEs using different synchronization timings to different resource element groups (REGs) in the each of frequency domain. For example, in order for a UE to receive a PSFCH from UEs using different synchronization timing, the UE may configure PSFCH regions for receiving PSFCHs from UEs using different synchronization timings to different subchannels in the each of frequency domain. For example, in order for a UE to receive a PSFCH from UEs using different synchronization timing, the UE may configure PSFCH regions for receiving PSFCHs from UEs using different synchronization timings to different resource blocks (RBs) in the each of frequency domain.

For example, in order for a UE to receive a PSFCH from UEs using different synchronization timing, the UE may configure PSFCH regions for receiving PSFCHs from UEs using different synchronization timings to be scrambled using different orthogonal code or sequence in the code domain.

In this case, each UE may mutually share information regarding a PSFCH region for receiving a PSFCH from UEs using different synchronization timings. Through this, when each UE transmits a PSFCH to the other UE, each UE can transmit a PSFCH on the PSFCH transmission region related to the synchronization timing used by itself. A UE receiving a PSFCH may obtain HARQ feedback information by detecting a PSFCH received on a PSFCH reception area related to a synchronization timing used by the UE. For example, a PSFCH transmission region may be configured in association with synchronization timing used by a UE transmitting a PSFCH, a PSFCH reception area may be configured in association with synchronization timing used by a UE receiving a PSFCH.

According to an embodiment of the present disclosure, a PSFCH region for each of UEs using different synchronization timings may be configured/determined.

For example, a PSFCH region for each of UEs using different synchronization timings may be configured/determined based on an ID of a group of UEs using the same synchronization timing. For example, a PSFCH region for each of UEs using different synchronization timings may be related to an ID of a group of UEs using the same synchronization timing.

For example, a PSFCH region for each of UEs using different synchronization timings may be configured/determined based on a synchronization priority on a synchronization reference (re)selection rule of synchronization criteria related to the synchronization timing. For example, a PSFCH region for each of UEs using different synchronization timings may be related to a synchronization priority on a synchronization reference (re)selection rule of synchronization criteria related to the synchronization timing.

For example, a PSFCH region for each of UEs using different synchronization timings may be configured/determined based on a synchronization reference with the highest priority (e.g., GNSS, gNB/eNB, etc.) on a synchronization reference (re)selection rule. For example, a PSFCH region for each of UEs using different synchronization timings may be related to a synchronization reference with the highest priority (e.g., GNSS, gNB/eNB, etc.) on a synchronization reference (re)selection rule.

For example, a PSFCH region for each of UEs using different synchronization timings may be configured/determined based on a temporal sequence of sending or receiving synchronization signals based on a specific reference timing (e.g., SFN or DFN). For example, a PSFCH region for each of UEs using different synchronization timings may be related to a temporal sequence of sending or receiving synchronization signals based on a specific reference timing (e.g., SFN or DFN).

For example, a PSFCH region for each of UEs using different synchronization timings may be configured/determined based on a temporal sequence of the timing of the first transmitted S-SSB within an S-SSB transmission period. For example, a PSFCH region for each of UEs using different synchronization timings may be related to a temporal sequence of the timing of the first transmitted S-SSB within an S-SSB transmission period.

For example, a PSFCH region for each of UEs using different synchronization timings may be configured/determined based on a time interval between S-SSBs transmitted within an S-SSB transmission period. For example, a PSFCH region for each of UEs using different synchronization timings may be related to a time interval between S-SSBs transmitted within an S-SSB transmission period.

For example, a PSFCH region for each of UEs using different synchronization timings may be configured/determined based on a priority of services transmitted and received between UEs. For example, a PSFCH region for each of UEs using different synchronization timings may be related to a priority of services transmitted and received between UEs.

For example, a PSFCH region for each of UEs using different synchronization timings may be configured/determined based on a QoS requirement for a service transmitted and received between UEs. For example, a PSFCH region for each of UEs using different synchronization timings may be related to a QoS requirement for a service transmitted and received between UEs.

For example, a PSFCH region for each of UEs using different synchronization timings may be configured/determined based on delay budget of packets transmitted and received between UEs. For example, a PSFCH region for each of UEs using different synchronization timings may be related to delay budget of packets transmitted and received between UEs.

For example, a PSFCH region for each of UEs using different synchronization timings may be configured/determined based on a distance requirement of a service transmitted and received between UEs. For example, a PSFCH region for each of UEs using different synchronization timings may be related to a distance requirement of a service transmitted and received between UEs.

For example, a PSFCH region for each of UEs using different synchronization timings may be configured/determined randomly. In this case, the randomly configured/determined PSFCH region may be shared between UEs.

For example, a PSFCH region for each of UEs using different synchronization timings may be predefined for a UE. For example, a base station/network may transmit a PSFCH region for each of UEs using different synchronization timings to a UE. For example, the information may be pre-configured or configured for a UE through higher layer signaling (e.g., RRC signaling). For example, the information may be transmitted to a UE through a MAC CE or DCI.

For example, information related to a PSFCH region for each of UEs using different synchronization timings may be transmitted from one UE to another UE through at least one of S-PSS, S-SSS and/or PSBCH within an S-SSB. For example, information related to a PSFCH region for each of UEs using different synchronization timings may be transmitted from one UE to another UE through PSCCH and/or PSSCH. For example, information related to a PSFCH region for each of UEs using different synchronization timings may be transmitted from one UE to another UE through a PSFCH. For example, information related to a PSFCH region for each of UEs using different synchronization timings may be transmitted from one UE to another UE through a MAC CE. For example, information related to a PSFCH region for each of UEs using different synchronization timings may be transmitted from one UE to another UE through SL higher layer signaling (e.g., PC-5 RRC signaling, etc.). For example, information related to a PSFCH region for each of UEs using different synchronization timings may be transmitted from one UE to another UE through at least one of PSBCH DMRS, PSCCH DMRS and/or PSSCH DMRS. For example, information related to a PSFCH region for each of UEs using different synchronization timings may be transmitted from one UE to another UE through a reference signal (e.g., PT-RS, CSI-RS, etc.). For example, information related to a PSFCH region for each of UEs using different synchronization timings may be transmitted from one UE to another UE through a sequence such as Orthogonal Cover Code (OCC) that can be additionally applied to a DMRS. For example, information related to a PSFCH region for each of UEs using different synchronization timings may be transmitted from one UE to another UE through a temporary indication signal used for SL communication similar to SL-RNTI, etc.

According to an embodiment of the present disclosure, when a PSFCH is configured according to different synchronization timings, after a first PSFCH area is configured, the remaining other PSFCH areas may be configured in association with the first configured PSFCH area.

According to an embodiment of the present disclosure, a PSFCH region for each of UEs using different synchronization timing may be configured/determined based on an SL-S SID of synchronization reference. For example, a PSFCH region for each of UEs using different synchronization timing may be related to an SL-SSID of synchronization reference.

For example, a PSFCH region for each of UEs using different synchronization timing may be configured/determined based on an LSB part of an SL-SSID (e.g., the rest of the LSB part of the SL-SSID excluding MSB 1 bit). For example, a PSFCH region for each of UEs using different synchronization timing may be related to an LSB part of an SL-SSID (e.g., the rest of the LSB part of the SL-SSID excluding MSB 1 bit).

For example, a PSFCH region for each of UEs using different synchronization timing may be configured/determined based on an InCoverage field value transmitted through an LSB part of the SL-SSID and a PSBCH. For example, a PSFCH region for each of UEs using different synchronization timing may be related to an InCoverage field value transmitted through an LSB part of the SL-SSID and a PSBCH. For example, even if an SL-SSID is the same, a UE may be configured to use different PSFCH regions for the case of 'inCoverage field=1' (when the synchronization reference source UE is within the coverage of network) and the case of 'inCoverage field=0' (when the synchronization reference source UE is outside the coverage of network).

For example, a PSFCH region for each of UEs using different synchronization timing may be configured/determined based on an index of a frame and/or an index of a slot in which an S-SSB is transmitted. For example, a PSFCH region for each of UEs using different synchronization timing may be related to an index of a frame and/or an index of a slot in which an S-SSB is transmitted.

For example, according to the various embodiments described above, in a case that each of the UEs using different synchronization timing determines a different PSFCH region, and each of the UEs using different synchronization timing transmits the PSFCH using resources on the different PSFCH region, due to the hidden node problem, PSFCH resource regions may collide between UEs using different synchronization timings.

For example, when PSFCH regions used by UEs using different synchronization timings collide with each other, a UE may drop transmission or reception of at least one PSFCH based on a priority of a PSSCH related to each a PSFCH. For example, when PSFCH regions used by UEs using different synchronization timings collide with each other, a UE may drop transmission or reception of at least one PSFCH based on QoS of PSSCH related to each PSFCH. For example, when PSFCH regions used by UEs using different synchronization timings collide with each other, a UE may drop transmission or reception of at least one PSFCH based on Packet Delay Budget (PDB) of a PSSCH related to each PSFCH. For example, when PSFCH regions used by UEs using different synchronization timings collide with each other, a UE may drop transmission or reception of at least one PSFCH based on the distance between itself and a UE receiving or transmitting a PSSCH related to each PSFCH.

For example, when PSFCH regions used by UEs using different synchronization timings collide with each other, a UE may drop transmission or reception of at least one PSFCH based on a priority of data received or transmitted through a PSSCH related to each PSFCH. For example, when PSFCH regions used by UEs using different synchronization timings collide with each other, a UE may drop transmission or reception of at least one PSFCH based on QoS of data received or transmitted over a PSSCH related to each PSFCH. For example, when PSFCH regions used by UEs using different synchronization timings collide with each other, a UE may drop transmission or reception of at least one PSFCH based on Packet Delay Budget (PDB) of data received or transmitted over a PSSCH related to each PSFCH. For example, when PSFCH regions used by UEs using different synchronization timings collide with each other, a UE may drop transmission or reception of at least one PSFCH based on the distance between itself and a UE receiving or transmitting data through a PSSCH related to each PSFCH.

According to an embodiment of the present disclosure, when PSFCH resource regions collide between UEs using different synchronization timings, a UE may drop transmission or reception of at least one PSFCH. For example, a UE may drop transmission or reception of at least one PSFCH according to a higher order of an index indicating a PSFCH region, an RB/subchannel index, or a frame/slot/symbol index. For example, a UE may drop transmission or reception of at least one PSFCH according to a lower order of an index indicating a PSFCH region, an RB/subchannel index, or a frame/slot/symbol index. For example, a UE may drop transmission or reception of at least one PSFCH according to a higher order of SL-S SIDS related to PSFCH regions. For example, a UE may drop transmission or reception of at least one PSFCH according to a lower order of SL-SSIDs related to PSFCH regions. For example, a UE may drop transmission or reception of a PSFCH with a low synchronization priority on the synchronization criterion selection rule indicated by the SL-SSID related to the PSFCH region.

According to an embodiment of the present disclosure, when PSFCH resource regions collide between UEs using different synchronization timings, a UE may drop transmission or reception of at least one PSFCH. For example, a UE may drop transmission or reception of at least one PSFCH according to an ID of a group of UEs using the same synchronization timing related to the determination of the corresponding PSFCH region. For example, a UE may drop transmission or reception of at least one PSFCH according to a synchronization criterion with the highest priority (e.g., GNSS, gNB/eNB, etc.) on the synchronization criterion (re)selection rule related to the determination of the corresponding PSFCH area. For example, a UE may drop transmission or reception of at least one PSFCH according to the temporal order of transmission or reception of a synchronization signal based on a specific reference timing (e.g., SFN or DFN) related to the determination of the corresponding PSFCH area. For example, a UE may drop transmission or reception of at least one PSFCH according to the temporal order according to the timing of the first transmitted S-SSB within an S-SSB transmission period related to the determination of the corresponding PSFCH region. For example, a UE may drop transmission or reception of at least one PSFCH according to a time interval between S-SSBs transmitted within an S-SSB transmission period related to the determination of the corresponding PSFCH region. For example, a UE may drop transmission or reception of at least one PSFCH according to at least one of service priority, QoS, packet delay budget (PDB), and/or distance requirements related to SL communication between UEs related to the determination of the corresponding PSFCH area.

According to various embodiments of the present disclosure, when UEs performing SL communication using different synchronization timings maintain a plurality of different synchronization timings to enable mutual SL communication, a PSFCH transmission or reception area for transmitting SL HARQ feedback between UEs performing SL communication using different synchronization timings may be configured differently in the time domain, the frequency domain, and/or the code domain. Accordingly, complexity due to blind detection of a PSFCH of UEs can be reduced.

Figure 12:
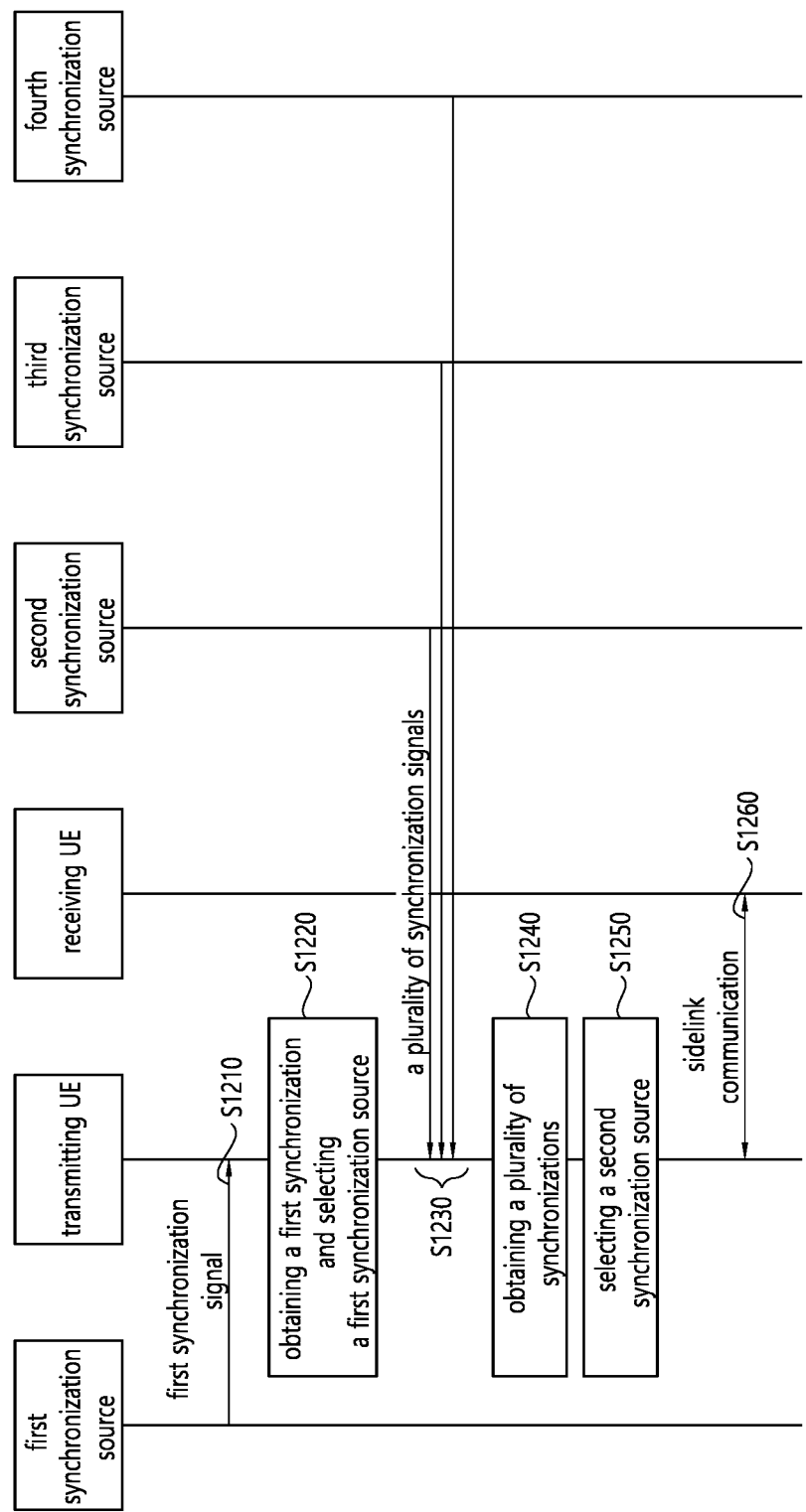
FIG. 12 shows a procedure for a transmitting UE to additionally select a second synchronization source according to an embodiment of the present disclosure.
Figure 13:
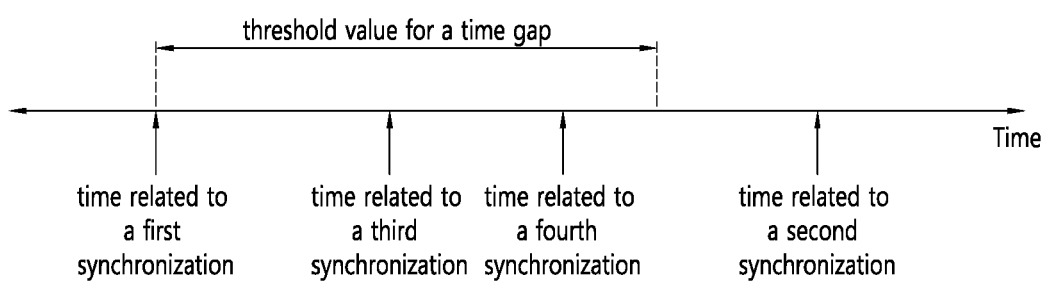
FIG. 13 is an example in which a UE selects one synchronization source from among a plurality of synchronization sources based on a threshold value for a time gap, according to an embodiment of the present disclosure.

FIG. 12 shows a procedure for a transmitting UE to additionally select a second synchronization source according to an embodiment of the present disclosure. FIG. 13 is an example in which a UE selects one synchronization source from among a plurality of synchronization sources based on a threshold value for a time gap, according to an embodiment of the present disclosure. The embodiments of FIG. 12 and FIG. 13 may be combined with various embodiments of the present disclosure.

Referring to FIG. 12, in step S1210, a transmitting UE may receive a first synchronization signal from a first synchronization source. For example, a first synchronization source may include at least one of a global navigation satellite system (GNSS), a base station, or a UE.

In step S1220, a transmitting UE may select a first synchronization source based on a sidelink synchronization priority. For example, the sidelink synchronization priority may include a relationship between a synchronization source and a synchronization priority. For example, the sidelink synchronization priority may be in a form of Table 5 or Table 6 described above.

In step S1230, the transmitting UE may receive a plurality of synchronization signals from a plurality of synchronization sources. For example, the plurality of synchronization sources may include a second synchronization source, a third synchronization source, and a fourth synchronization source. For example, the second synchronization source, the third synchronization source, and the fourth synchronization source may include at least one of a GNSS, a base station, or a UE. For example, the sidelink synchronization priority and sidelink synchronization priorities for the plurality of synchronization sources may be different. For example, a synchronization source with the highest priority related to the sidelink synchronization priority may be different from a synchronization source with the highest priority related to a sidelink synchronization priorities for the plurality of synchronization sources. For example, a sidelink synchronization priority for the second synchronization source may be different from a sidelink synchronization priority for the first synchronization source. For example, a synchronization source with the highest priority related to the sidelink synchronization priority for the first synchronization source and a synchronization source with the highest priority related to the sidelink synchronization priority for the second synchronization source may be different.

In step S1240, the transmitting UE may obtain a plurality of synchronizations based on a plurality of synchronization signals.

In step S1250, the transmitting UE may select a second synchronization source from among a plurality of synchronization sources based on a gap between the time related to the first synchronization and the time related to the second synchronization greater than or equal to a threshold value. For example, the threshold value may include at least one of ratio related to cyclic prefix, ratio related to duration of sidelink symbol, ratio related to duration of sidelink slot, ratio related to duration of sidelink subframe, ratio related to duration of sidelink frame, time value. For example, the threshold value for the time gap may be pre-configured or configured by higher layer signaling from network. For example, the threshold value may be signaled to the first device 100 from a base station through a MAC CE or DCI. For example, the threshold value may be a ratio (e.g., 25%, 50%, 100%, 200% of cyclic prefix, etc.) to cyclic prefix based on sidelink numerology. Or, for example, the threshold value for the time gap may be a ratio to a duration of a sidelink symbol, a duration of a sidelink slot, a duration of a sidelink subframe, or a duration of a sidelink frame. Alternatively, for example, which criterion and which ratio are to be used as the criterion among the above-described durations may be predefined. For example, information regarding the criterion and ratio for the above-described duration may be pre-configured or configured to a UE through higher layer signaling from network. For example, information regarding the criterion and ratio for the above-described duration may be signaled from a base station to a UE through a MAC CE or DCI. Or, for example, the threshold value may be an absolute time value (e.g., microseconds, milliseconds) or a ratio of an absolute time value.

Specifically, referring to FIG. 13, in addition to a first synchronization, a transmitting UE may obtain a second synchronization based on a second synchronization source, a third synchronization based on a third synchronization source, and a fourth synchronization based on a fourth synchronization source. At this time, for example, since a gap between the time related to the third synchronization and the time related to the first synchronization and a gap between the time related to the fourth synchronization and the time related to the first synchronization are smaller than a threshold for a time gap, the transmitting UE may not select the third synchronization source and the fourth synchronization source. For example, since a gap between the time related to the second synchronization and the time related to the first synchronization is greater than the threshold value for the time gap, the transmitting UE may additionally select the second synchronization source.

For example, a transmitting UE may receive information related to a synchronization source from neighboring UEs. For example, a transmitting UE may select a second synchronization source from among a plurality of synchronization sources based on synchronization source-related information received from neighboring UEs. For example, when a synchronization source of a receiving UE is a second synchronization source and a transmitting UE receives information related to the second synchronization source from the receiving UE, the transmitting UE may select the second synchronization source from among a plurality of synchronization sources based on a gap between the time related to a first synchronization and the time related to the second synchronization greater than or equal to a threshold value.

For example, a priority of a second synchronization source may be higher than priority level configured based on a sidelink synchronization priority. For example, when a priority of the third synchronization source and a priority of the fourth synchronization source are lower than the configured priority level, and a priority of a second synchronization source is higher than configured priority level, a transmitting UE may select the second synchronization source. For example, information regarding priority level may be pre-configured or configured to a transmitting UE through higher layer signaling from network. For example, information regarding priority level may be signaled from a base station to a transmitting UE through MAC CE or DCI.

For example, a priority of a second synchronization source may be higher than or equal to a priority of a first synchronization source. For example, when a priority of a third synchronization source and a priority of a fourth synchronization source are lower than a priority of a first synchronization source, and a priority of a second synchronization source is higher than or equal to the priority of the first synchronization source, a transmitting UE may select the second synchronization source. For example, when a sidelink synchronization priority for a second synchronization source is the same as a sidelink synchronization priority for a first synchronization source, a priority of the second synchronization source may be higher than or equal to a priority of the first synchronization source.

For example, synchronization sources may be selected among the plurality of synchronization sources up to a configured number of synchronization sources. For example, a transmitting UE may select synchronization sources up to a configured number of synchronization sources. For example, a transmitting UE may select synchronization sources among a plurality of synchronization sources may be selected up to a configured number of synchronization sources. For example, information regarding the number of synchronization sources may be pre-configured or configured to a transmitting UE through a higher layer signaling from network. For example, information regarding synchronization sources may be signaled to a transmitting UE through a MAC CE or DCI from a base station.

For example, a transmitting UE may transmit information related to a first synchronization source and a second synchronization source to a neighboring device. For example, a transmitting UE may transmit information regarding a plurality of selected synchronization sources to a neighboring device. Here, a transmitting UE may transmit information regarding a plurality of selected synchronization sources through various embodiments of the present disclosure described above.

For example, a cast type performed by a second synchronization source and a cast type performed by a first synchronization source may be different. For example, when a transmitting UE performs unicast communication by a first synchronization source and broadcast communication by a second synchronization source, a transmitting UE may select a second synchronization source. For example, a priority related to a cast type may be preconfigured or configured to a transmitting UE by a network or a base station.

For example, at least one of QoS, a priority or reliability of a service performed by a second synchronization source may be higher than QoS, a priority or reliability of a service performed by a first synchronization source. For example, a transmitting UE may select a second synchronization source with a high QoS of service from among a plurality of synchronization sources. For example, a transmitting UE may select a second synchronization source with high reliability from among a plurality of synchronization sources. For example, a transmitting UE may select a second synchronization source with a short packet delay budget from among a plurality of synchronization sources. For example, a transmitting UE may select a second synchronization source with a short distance from among a plurality of synchronization sources.

For example, reference signal received power (RSRP) or received signal strength indicator (RSSI) measured based on a second synchronization source may be higher than a threshold value related to RSRP or RSSI. For example, RSRP or RSSI measured based on a second synchronization source may be higher than RSRP or RSSI measured based on a first synchronization source. For example, a transmitting UE may select a second synchronization source with a higher measured RSRP or RSSI than a threshold value among a plurality of synchronization sources. For example, a transmitting UE may select a second synchronization source measured with a higher RSRP or RSSI than RSRP or RSSI based on a first synchronization source from among a plurality of synchronization sources.

In step S1260, a transmitting UE may perform sidelink communication with a receiving UE based on a first synchronization or a second synchronization. Here, for example, a second synchronization may be obtained based on a second synchronization source. For example, a transmitting UE may transmit a sidelink-synchronization signal block (S-SSB) block to a receiving UE based on a first synchronization or a second synchronization. For example, an S-SSB block may include a sidelink primary synchronization signal (S-PSS), a sidelink secondary synchronization signal (S-SSS), and a physical sidelink broadcast channel (PSBCH).

Figure 14:
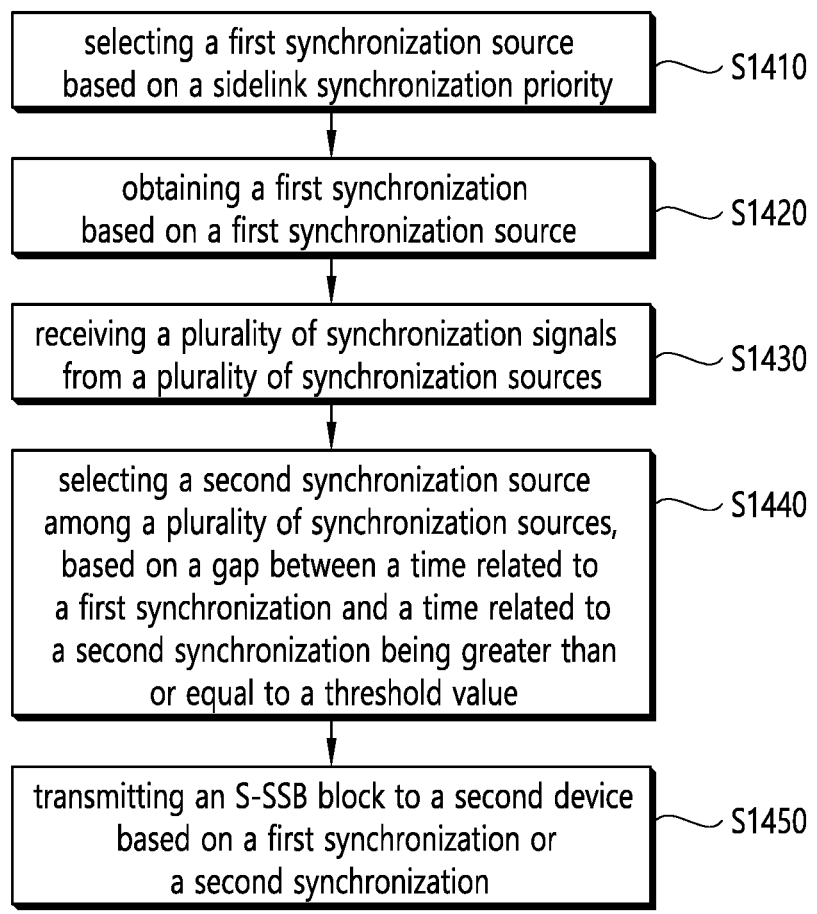
FIG. 14 shows a method for a first device to select a first synchronization source and a second synchronization source according to an embodiment of the present disclosure.

FIG. 14 shows a method for a first device to select a first synchronization source and a second synchronization source according to an embodiment of the present disclosure. The embodiment of FIG. 14 may be combined with various embodiments of the present disclosure.

Referring to FIG. 14, in step S1410, a first device 100 100 may select a first synchronization source based on a sidelink synchronization priority. For example, the first synchronization source may include global navigation satellite system (GNSS), base station, or a user equipment (UE). For example, the sidelink synchronization priority may include a relationship between a synchronization source and a synchronization priority. For example, the sidelink synchronization priority may be in a form of Table 5 or Table 6 described above.

In step S1420, the first device 100 may obtain a first synchronization based on the first synchronization source.

In step S1430, the first device 100 may receive a plurality of synchronization signals from a plurality of synchronization sources. For example, the sidelink synchronization priority and sidelink synchronization priorities for the plurality of synchronization sources may be different. For example, a synchronization source with the highest priority related to the sidelink synchronization priority may be different from a synchronization source with the highest priority related to a sidelink synchronization priorities for the plurality of synchronization sources. For example, a sidelink synchronization priority for the second synchronization source may be different from a sidelink synchronization priority for the first synchronization source. For example, a synchronization source with the highest priority related to the sidelink synchronization priority for the first synchronization source and a synchronization source with the highest priority related to the sidelink synchronization priority for the second synchronization source may be different.

In step S1440, the first device 100 may select a second synchronization source among the plurality of synchronization sources, based on a gap between a time related to the first synchronization and a time related to a second synchronization being greater than or equal to a threshold value. For example, the second synchronization source may include GNSS, base station, or a UE. For example, the threshold value may include at least one of ratio related to cyclic prefix, ratio related to duration of sidelink symbol, ratio related to duration of sidelink slot, ratio related to duration of sidelink subframe, ratio related to duration of sidelink frame, time value. For example, the threshold value may be pre-configured or configured by higher layer signaling from network. For example, the threshold value may be signaled to the first device 100 from a base station through a MAC CE or DCI. For example, which criterion and which ratio are to be used among the above-described durations may be pre-defined for the first device 100. For example, the above-described information regarding the criterion and ratio for the above-described duration may be pre-configured or configured to the first device 100 through higher layer signaling from network. For example, information regarding the criteria and ratio for the above-described duration may be signaled from a base station to the first device 100 through MAC CE or DCI.

For example, the first device 100 may receive information regarding a synchronization source from neighboring UEs. For example, the first device 100 may select a second synchronization source among a plurality of synchronization sources based on the information regarding a synchronization source received from neighboring UEs. For example, when a synchronization source of a second device 200 is a second synchronization source, and when the first device 100 receives information regarding the second synchronization source from the second device 200, the first device 100 may select the second synchronization source among the plurality of synchronization sources based on a gap between a time related to a first synchronization and a time related to a second synchronization being greater than or equal to a threshold value.

For example, a priority of the second synchronization source may be higher than a priority level configured based on the sidelink synchronization priority. For example, when a priority of the second synchronization source is higher than configured priority level, the first device 100 may select the second synchronization source. For example, information regarding priority level may be pre-configured or configured to the first device 100 through a higher layer signaling from a network. For example, information regarding priority level may be signaled to the first device 100 through a MAC CE or DCI from a base station.

For example, a priority of the second synchronization source may be higher than or equal to a priority of the first synchronization source. For example, when a priority of the second synchronization source is higher than or equal to a priority of the first synchronization source, the first device 100 may select the second synchronization source. For example, a sidelink synchronization priority for the second synchronization source may be the same as a sidelink synchronization priority for the first synchronization source, and a priority of the second synchronization source may be higher than or equal to a priority of the first synchronization source.

For example, synchronization sources may be selected among the plurality of synchronization sources up to a configured number of synchronization sources. For example, the first device 100 may select synchronization sources up to a configured number of synchronization sources. For example, the first device 100 may select synchronization sources among the plurality of synchronization sources may be selected up to a configured number of synchronization sources. For example, information regarding the number of synchronization sources may be pre-configured or configured to the first device 100 through a higher layer signaling from network. For example, information regarding synchronization sources may be signaled to the first device 100 through a MAC CE or DCI from a base station.

For example, the first device 100 may transmit information related to the first synchronization source and the second synchronization source to a neighboring device. For example, the first device 100 may transmit information regarding a plurality of selected synchronization sources to a neighboring device. Here, the first device 100 may transmit information regarding a plurality of selected synchronization sources through various embodiments of the present disclosure described above.

For example, a cast type performed by the second synchronization source and a cast type performed by the first synchronization source may be different. For example, when the first device 100 performs unicast communication by a first synchronization source and broadcast communication by a second synchronization source, the first device 100 may select a second synchronization source. For example, a priority related to a cast type may be preconfigured or configured to the first device 100 by a network or a base station.

For example, at least one of QoS, a priority or reliability of a service performed by the second synchronization source may be higher than QoS, a priority or reliability of a service performed by the first synchronization source. For example, the first device 100 may select a second synchronization source with a high QoS of service from among a plurality of synchronization sources. For example, the first device 100 may select a second synchronization source with high reliability from among a plurality of synchronization sources. For example, the first device 100 may select a second synchronization source with a short packet delay budget from among a plurality of synchronization sources. For example, the first device 100 may select a second synchronization source with a short distance from among a plurality of synchronization sources.

For example, reference signal received power (RSRP) or received signal strength indicator (RSSI) measured based on the second synchronization source may be higher than a threshold value related to RSRP or RSSI. For example, RSRP or RSSI measured based on the second synchronization source may be higher than RSRP or RSSI measured based on the first synchronization source. For example, the first device 100 may select a second synchronization source with a higher measured RSRP or RSSI than a threshold value among a plurality of synchronization sources. For example, the first device 100 may select a second synchronization source measured with a higher RSRP or RSSI than RSRP or RSSI based on the first synchronization source from among a plurality of synchronization sources.

In step S1450, the first device 100 may transmit a sidelink-synchronization signal block (S-SSB) block to a second device based on the first synchronization or the second synchronization. Here, for example, the second synchronization may be obtained based on the second synchronization source. For example, the S-SSB block may include a sidelink primary synchronization signal (S-PSS), a sidelink secondary synchronization signal (S-SSS), and a physical sidelink broadcast channel (PSBCH).

The above-described embodiment may be applied to various devices described below. For example, a processor 102 of a first device 100 may select a first synchronization source based on a sidelink synchronization priority. And, the processor 102 of the first device 100 may obtain a first synchronization based on the first synchronization source. And, the processor 102 of the first device 100 may control a transceiver 106 to receive a plurality of synchronization signals from a plurality of synchronization sources. And, the processor 102 of the first device 100 may obtain a plurality of synchronizations based on the plurality of synchronization signals. And, the processor 102 of the first device 100 may select a second synchronization source among the plurality of synchronization sources, based on a gap between a time related to the first synchronization and a time related to a second synchronization being greater than or equal to a threshold value. And, the processor 102 of the first device 100 may control the transceiver 106 to transmit a sidelink-synchronization signal block (S-SSB) block to a second device 200 based on the first synchronization or the second synchronization.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: select a first synchronization source based on a sidelink synchronization priority; obtain a first synchronization based on the first synchronization source; receive a plurality of synchronization signals from a plurality of synchronization sources; obtain a plurality of synchronizations based on the plurality of synchronization signals; select a second synchronization source among the plurality of synchronization sources, based on a gap between a time related to the first synchronization and a time related to a second synchronization being greater than or equal to a threshold value, wherein the second synchronization is obtained based on the second synchronization source; and transmit a sidelink-synchronization signal block (S-SSB) block to a second device based on the first synchronization or the second synchronization. For example, the first synchronization source and the second synchronization source may include global navigation satellite system (GNSS), base station, or a user equipment (UE). For example, the S-SSB block may include a sidelink primary synchronization signal (S-PSS), a sidelink secondary synchronization signal (S-SSS), and a physical sidelink broadcast channel (PSBCH).

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: select a first synchronization source based on a sidelink synchronization priority; obtain a first synchronization based on the first synchronization source; receive a plurality of synchronization signals from a plurality of synchronization sources; obtain a plurality of synchronizations based on the plurality of synchronization signals; select a second synchronization source among the plurality of synchronization sources, based on a gap between a time related to the first synchronization and a time related to a second synchronization being greater than or equal to a threshold value, wherein the second synchronization is obtained based on the second synchronization source; and transmit a sidelink-synchronization signal block (S-SSB) block to a second UE based on the first synchronization or the second synchronization. For example, the first synchronization source and the second synchronization source may include global navigation satellite system (GNSS), base station, or a UE. For example, the S-SSB block may include a sidelink primary synchronization signal (S-PSS), a sidelink secondary synchronization signal (S-SSS), and a physical sidelink broadcast channel (PSBCH).

According to an embodiment of the present disclosure, a non-transitory computer-readable storage medium storing instructions mat be proposed. For example, the instructions, when executed, may cause a first device to: select a first synchronization source based on a sidelink synchronization priority; obtain a first synchronization based on the first synchronization source; receive a plurality of synchronization signals from a plurality of synchronization sources; obtain a plurality of synchronizations based on the plurality of synchronization signals; select a second synchronization source among the plurality of synchronization sources, based on a gap between a time related to the first synchronization and a time related to a second synchronization being greater than or equal to a threshold value, wherein the second synchronization is obtained based on the second synchronization source; and transmit a sidelink-synchronization signal block (S-SSB) block to a second device based on the first synchronization or the second synchronization. For example, the first synchronization source and the second synchronization source may include global navigation satellite system (GNSS), base station, or a user equipment (UE). For example, the S-SSB block may include a sidelink primary synchronization signal (S-PSS), a sidelink secondary synchronization signal (S-SSS), and a physical sidelink broadcast channel (PSBCH).

Figure 15:
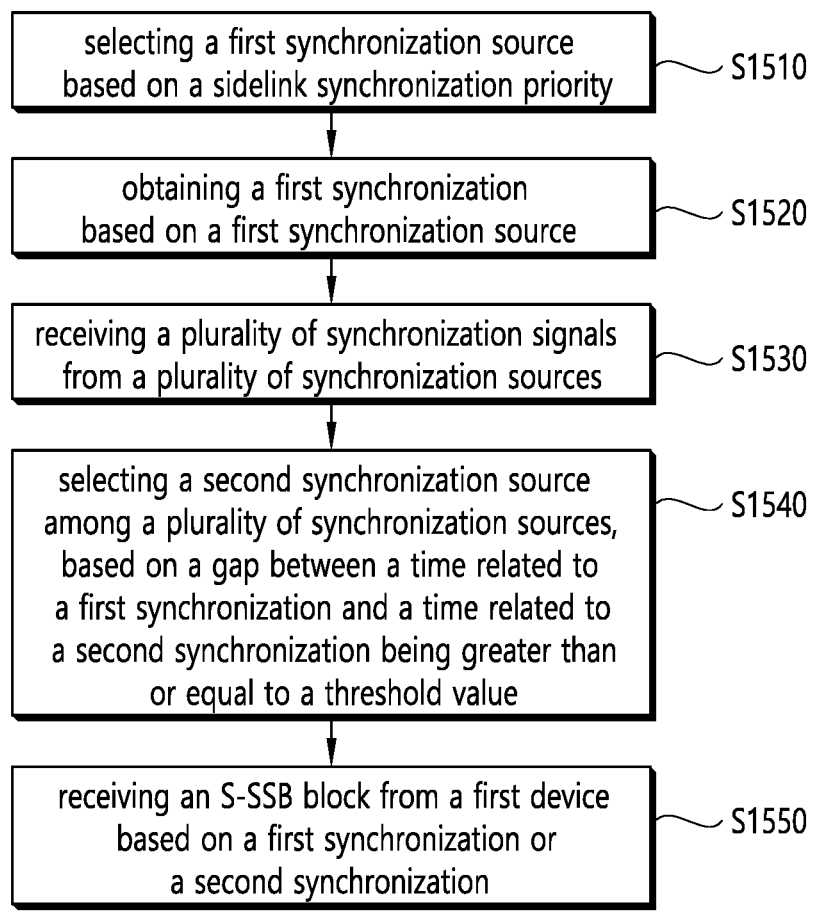
FIG. 15 shows a method for a second device to select a first synchronization source and a second synchronization source according to an embodiment of the present disclosure.

FIG. 15 shows a method for a second device to select a first synchronization source and a second synchronization source according to an embodiment of the present disclosure. The embodiment of FIG. 15 may be combined with various embodiments of the present disclosure.

Referring to FIG. 15, in step S1510, a second device 200 may select a first synchronization source based on a sidelink synchronization priority. For example, the first synchronization source may include global navigation satellite system (GNSS), base station, or a user equipment (UE). For example, the sidelink synchronization priority may include a relationship between a synchronization source and a synchronization priority. For example, the sidelink synchronization priority may be in a form of Table 5 or Table 6 described above.

In step S1520, the second device 200 may obtain a first synchronization based on the first synchronization source.

In step S1530, the second device 200 may receive a plurality of synchronization signals from a plurality of synchronization sources. For example, the sidelink synchronization priority and sidelink synchronization priorities for the plurality of synchronization sources may be different. For example, a synchronization source with the highest priority related to the sidelink synchronization priority may be different from a synchronization source with the highest priority related to a sidelink synchronization priorities for the plurality of synchronization sources. For example, a sidelink synchronization priority for the second synchronization source may be different from a sidelink synchronization priority for the first synchronization source. For example, a synchronization source with the highest priority related to the sidelink synchronization priority for the first synchronization source and a synchronization source with the highest priority related to the sidelink synchronization priority for the second synchronization source may be different.

In step S1540, the second device 200 may select a second synchronization source among the plurality of synchronization sources, based on a gap between a time related to the first synchronization and a time related to a second synchronization being greater than or equal to a threshold value. For example, the second synchronization source may include GNSS, base station, or a UE. For example, the threshold value may include at least one of ratio related to cyclic prefix, ratio related to duration of sidelink symbol, ratio related to duration of sidelink slot, ratio related to duration of sidelink subframe, ratio related to duration of sidelink frame, time value. For example, the threshold value may be pre-configured or configured by higher layer signaling from network. For example, the threshold value may be signaled to the second device 200 from a base station through a MAC CE or DCI. For example, which criterion and which ratio are to be used among the above-described durations may be predefined for the second device 200. For example, the above-described information regarding the criterion and ratio for the above-described duration may be pre-configured or configured to the second device 200 through higher layer signaling from network. For example, information regarding the criteria and ratio for the above-described duration may be signaled from a base station to the second device 200 through MAC CE or DCI.

For example, the second device 200 may receive information regarding a synchronization source from neighboring UEs. For example, the second device 200 may select a second synchronization source among a plurality of synchronization sources based on the information regarding a synchronization source received from neighboring UEs. For example, when a synchronization source of a first device 100 is a second synchronization source, and when the second device 200 receives information regarding the second synchronization source from the first device 100, the second device 200 may select the second synchronization source among the plurality of synchronization sources based on a gap between a time related to a first synchronization and a time related to a second synchronization being greater than or equal to a threshold value.

For example, a priority of the second synchronization source may be higher than a priority level configured based on the sidelink synchronization priority. For example, when a priority of the second synchronization source is higher than configured priority level, the second device 200 may select the second synchronization source. For example, information regarding priority level may be pre-configured or configured to the second device 200 through a higher layer signaling from a network. For example, information regarding priority level may be signaled to the second device 200 through a MAC CE or DCI from a base station.

For example, a priority of the second synchronization source may be higher than or equal to a priority of the first synchronization source. For example, when a priority of the second synchronization source is higher than or equal to a priority of the first synchronization source, the second device 200 may select the second synchronization source. For example, a sidelink synchronization priority for the second synchronization source may be the same as a sidelink synchronization priority for the first synchronization source, and a priority of the second synchronization source may be higher than or equal to a priority of the first synchronization source.

For example, synchronization sources may be selected among the plurality of synchronization sources up to a configured number of synchronization sources. For example, the second device 200 may select synchronization sources up to a configured number of synchronization sources. For example, the second device 200 may select synchronization sources among the plurality of synchronization sources may be selected up to a configured number of synchronization sources. For example, information regarding the number of synchronization sources may be preconfigured or configured to the second device 200 through a higher layer signaling from network. For example, information regarding synchronization sources may be signaled to the second device 200 through a MAC CE or DCI from a base station.

For example, the second device 200 may transmit information related to the first synchronization source and the second synchronization source to a neighboring device. For example, the second device 200 may transmit information regarding a plurality of selected synchronization sources to a neighboring device. Here, the second device 200 may transmit information regarding a plurality of selected synchronization sources through various embodiments of the present disclosure described above.

For example, a cast type performed by the second synchronization source and a cast type performed by the first synchronization source may be different. For example, when the second device 200 performs unicast communication by a first synchronization source and broadcast communication by a second synchronization source, the second device 200 may select a second synchronization source. For example, a priority related to a cast type may be preconfigured or configured to the second device 200 by a network or a base station.

For example, at least one of QoS, a priority or reliability of a service performed by the second synchronization source may be higher than QoS, a priority or reliability of a service performed by the first synchronization source. For example, the second device 200 may select a second synchronization source with a high QoS of service from among a plurality of synchronization sources. For example, the second device 200 may select a second synchronization source with high reliability from among a plurality of synchronization sources. For example, the second device 200 may select a second synchronization source with a short packet delay budget from among a plurality of synchronization sources. For example, the first device 100 may select a second synchronization source with a short distance from among a plurality of synchronization sources.

For example, reference signal received power (RSRP) or received signal strength indicator (RSSI) measured based on the second synchronization source may be higher than a threshold value related to RSRP or RSSI. For example, RSRP or RSSI measured based on the second synchronization source may be higher than RSRP or RSSI measured based on the first synchronization source. For example, the second device 200 may select a second synchronization source with a higher measured RSRP or RSSI than a threshold value among a plurality of synchronization sources. For example, the second device 200 may select a second synchronization source measured with a higher RSRP or RSSI than RSRP or RSSI based on the first synchronization source from among a plurality of synchronization sources.

In step S1550, the second device 200 may receive a sidelink-synchronization signal block (S-SSB) block from a first device 100 based on the first synchronization or the second synchronization. Here, for example, the second synchronization may be obtained based on the second synchronization source. For example, the S-SSB block may include a sidelink primary synchronization signal (S-PSS), a sidelink secondary synchronization signal (S-SSS), and a physical sidelink broadcast channel (PSBCH).

The above-described embodiment may be applied to various devices described below. For example, a processor 202 of a second device 200 may select a first synchronization source based on a sidelink synchronization priority. And, the processor 202 of the second device 200 may obtain a first synchronization based on the first synchronization source. And, the processor 202 of the second device 200 may control a transceiver 206 to receive a plurality of synchronization signals from a plurality of synchronization sources. And, the processor 202 of the second device 200 may obtain a plurality of synchronizations based on the plurality of synchronization signals. And, the processor 202 of the second device 200 may select a second synchronization source among the plurality of synchronization sources, based on a gap between a time related to the first synchronization and a time related to a second synchronization being greater than or equal to a threshold value. And, the processor 202 of the second device 200 may control the transceiver 206 to receive a sidelink-synchronization signal block (S-SSB) block from a first device 100 based on the first synchronization or the second synchronization.

According to an embodiment. Of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: select a first synchronization source based on a sidelink synchronization priority; obtain a first synchronization based on the first synchronization source; receive a plurality of synchronization signals from a plurality of synchronization sources; obtain a plurality of synchronizations based on the plurality of synchronization signals; select a second synchronization source among the plurality of synchronization sources, based on a gap between a time related to the first synchronization and a time related to a second synchronization being greater than or equal to a threshold value, wherein the second synchronization is obtained based on the second synchronization source; and receive a sidelink-synchronization signal block (S-SSB) block from a first device 100 based on the first synchronization or the second synchronization. For example, the first synchronization source and the second synchronization source may include global navigation satellite system (GNSS), base station, or a user equipment (UE). For example, the S-SSB block may include a sidelink primary synchronization signal (S-PSS), a sidelink secondary synchronization signal (S-SSS), and a physical sidelink broadcast channel (PSBCH).

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
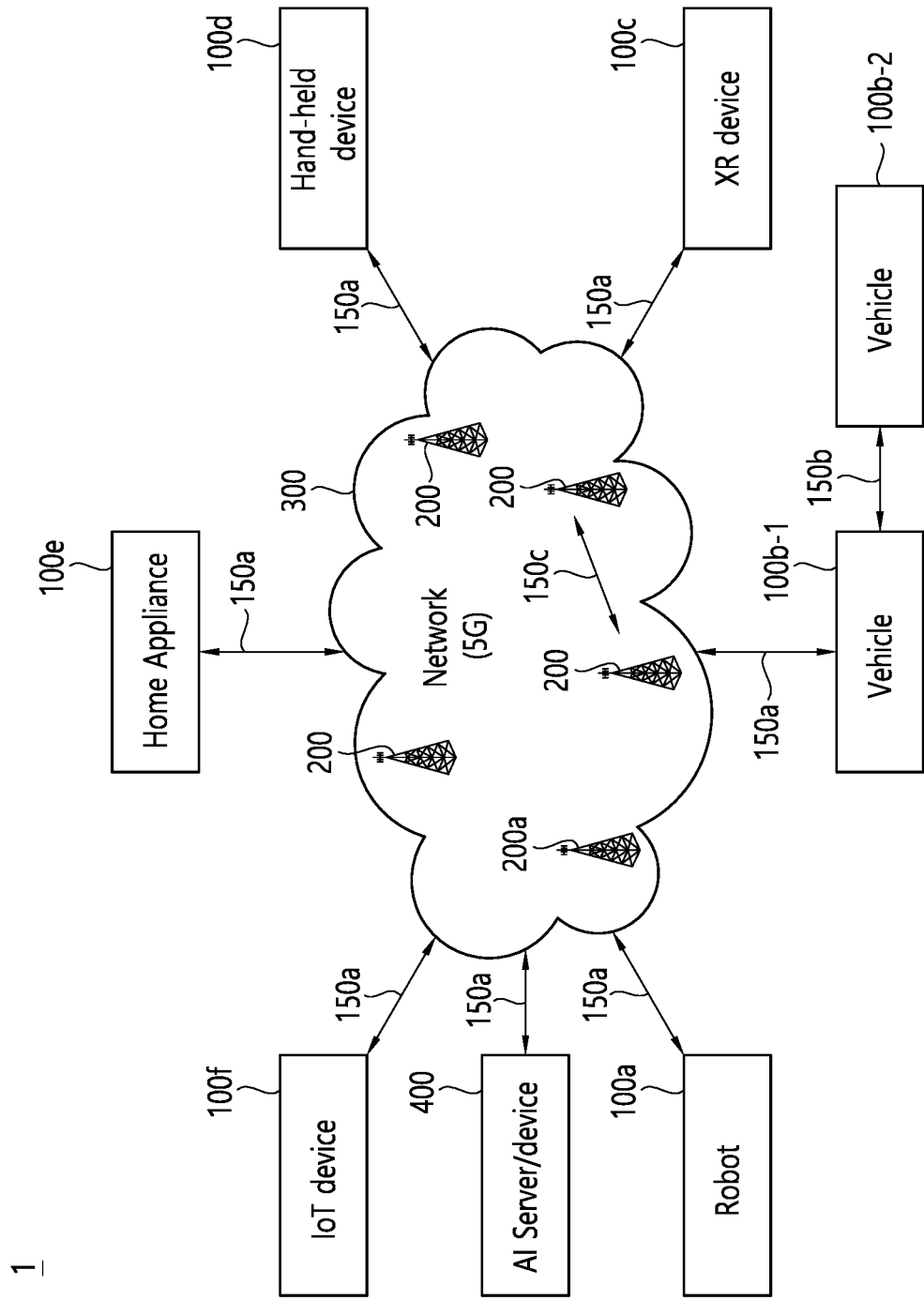
FIG. 16 shows a communication system 1, based on an embodiment of the present disclosure.

FIG. 16 shows a communication system 1, based on an embodiment of the present disclosure. The embodiment of FIG. 16 may be combined with various embodiments of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
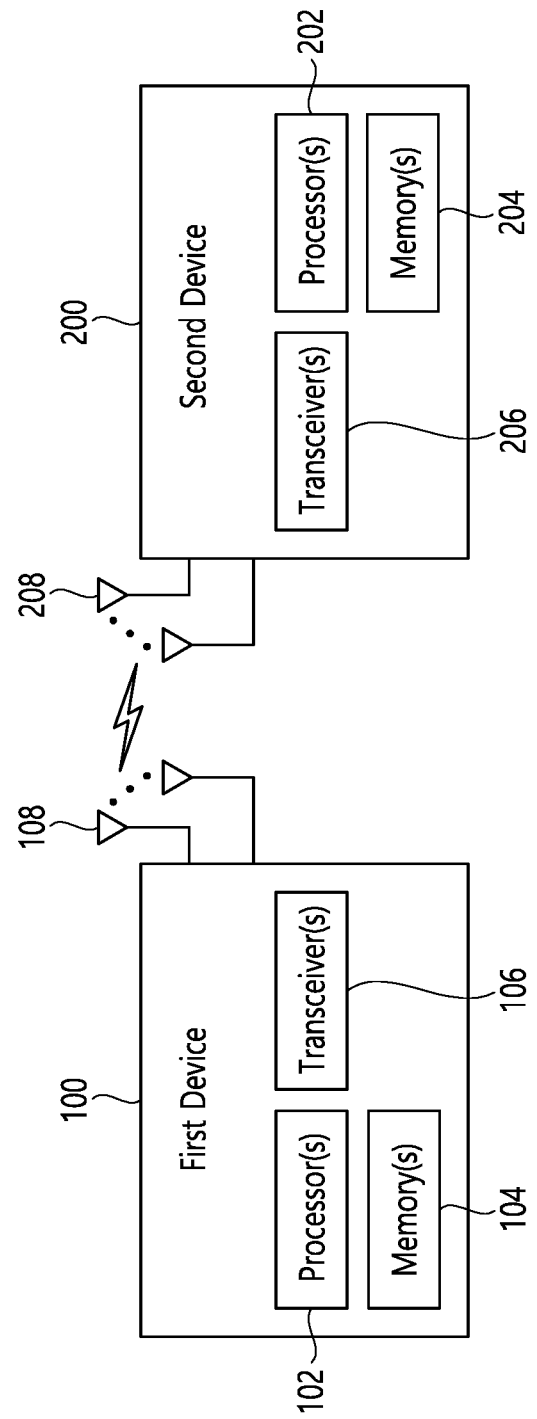
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
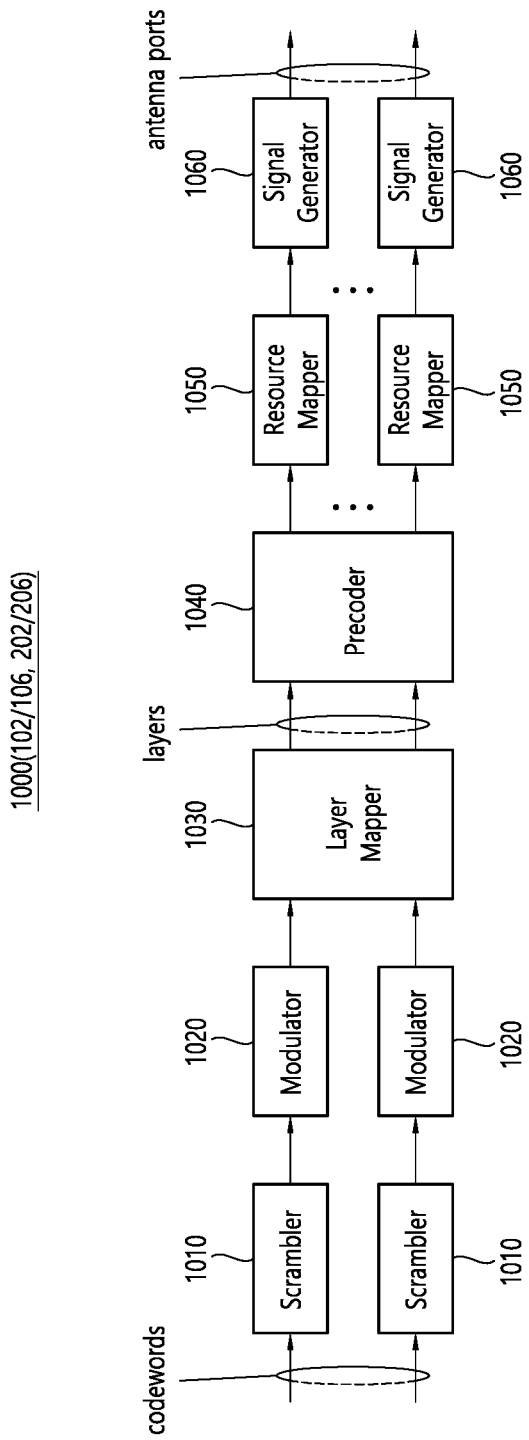
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
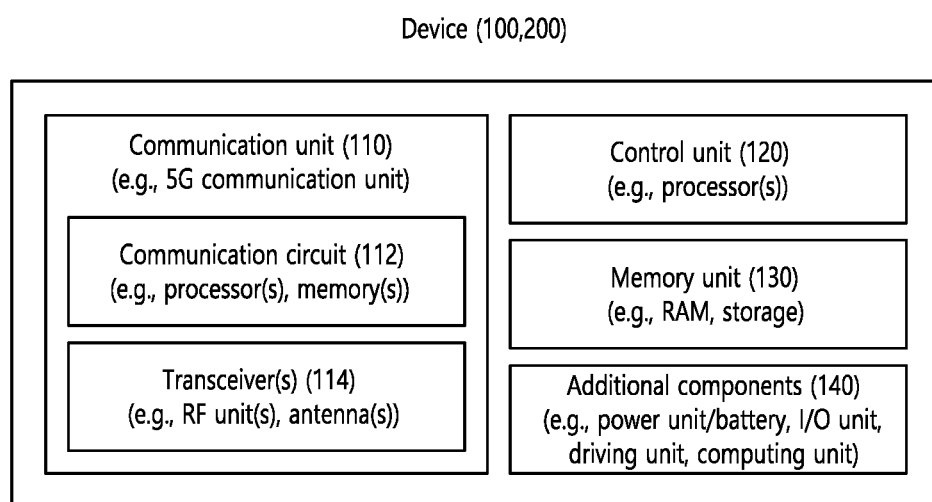
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
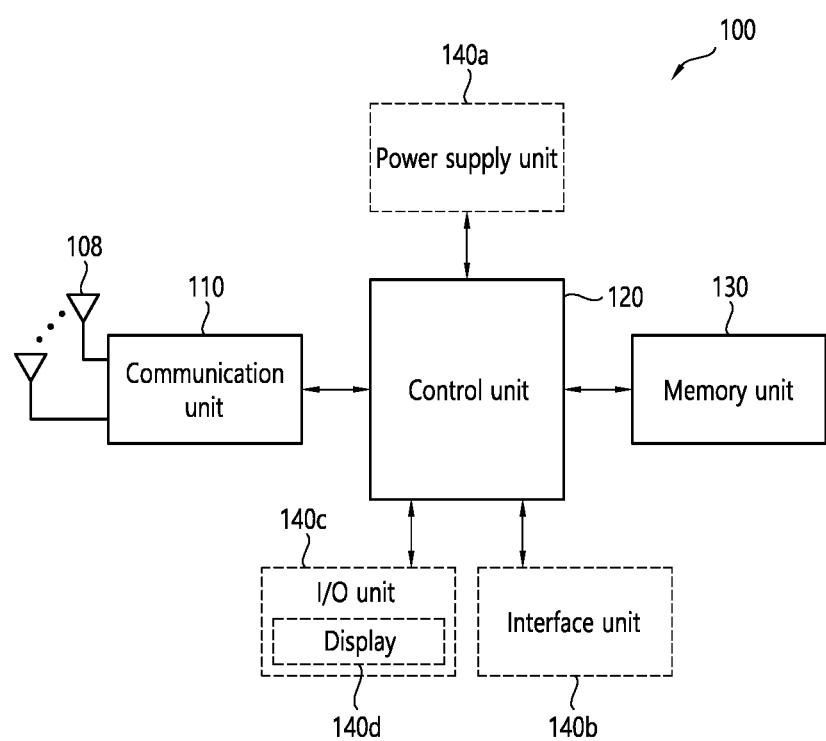
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may obtain information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
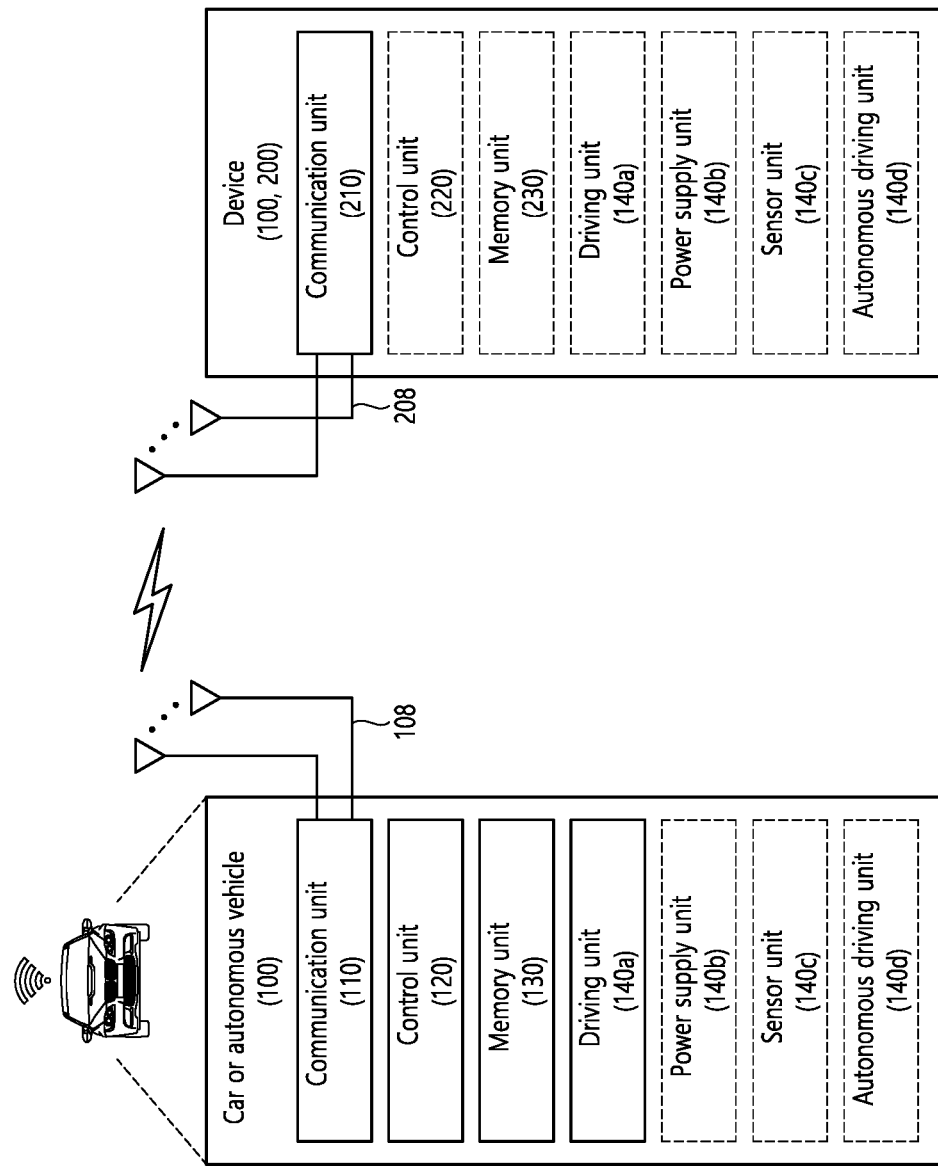
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may obtain a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically obtain recent traffic information data from the external server and obtain surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    selecting a first synchronization source based on a sidelink synchronization priority;
    obtaining a first synchronization based on the first synchronization source;
    receiving a plurality of synchronization signals from a plurality of synchronization sources;
    obtaining a plurality of synchronizations based on the plurality of synchronization signals;
    selecting a second synchronization source among the plurality of synchronization sources, based on a gap between a time related to the first synchronization and a time related to a second synchronization being greater than or equal to a threshold value,
    wherein the second synchronization is obtained based on the second synchronization source; and
    transmitting a sidelink-synchronization signal block (S-SSB) block to a second device based on the first synchronization or the second synchronization,
    wherein the first synchronization source and the second synchronization source include global navigation satellite system (GNSS), base station, or a user equipment (UE),
    wherein the S-SSB block includes a sidelink primary synchronization signal (S-PSS), a sidelink secondary synchronization signal (S-SSS), and a physical sidelink broadcast channel (PSBCH).

2. The method of claim 1, wherein the second synchronization source is selected based on information related to a synchronization source received to the first device from neighboring UEs.

3. The method of claim 1, wherein a priority of the second synchronization source is higher than a priority level configured based on the sidelink synchronization priority.

4. The method of claim 1, wherein a sidelink synchronization priority for the second synchronization source is the same as a sidelink synchronization priority for the first synchronization source, and
    wherein a priority of the second synchronization source is higher than or equal to a priority of the first synchronization source.

5. The method of claim 1, wherein a sidelink synchronization priority for the second synchronization source is different from a sidelink synchronization priority for the first synchronization source.

6. The method of claim 1, wherein the plurality of synchronization sources are selected up to a configured number of synchronization sources.

7. The method of claim 1, further comprising:
    transmitting information related to the first synchronization source and the second synchronization source to a neighboring device.

8. The method of claim 1, wherein a cast type performed by the second synchronization source and a cast type performed by the first synchronization source are different.

9. The method of claim 1, wherein at least one of QoS, a priority or reliability of a service performed by the second synchronization source is higher than QoS, a priority or reliability of a service performed by the first synchronization source.

10. The method of claim 1, wherein reference signal received power (RSRP) or received signal strength indicator (RSSI) measured based on the second synchronization source is higher than a threshold value related to RSRP or RSSI.

11. The method of claim 1, wherein RSRP or RSSI measured based on the second synchronization source is higher than RSRP or RSSI measured based on the first synchronization source.

12. The method of claim 1, wherein the threshold value includes at least one of ratio related to cyclic prefix, ratio related to duration of sidelink symbol, ratio related to duration of sidelink slot, ratio related to duration of sidelink subframe, ratio related to duration of sidelink frame, time value.

13. The method of claim 1, wherein the threshold value is signaled to the first device from a base station or network.

14. A first device for performing wireless communication, the first device comprising:
    one or more memories storing instructions;
    one or more transceivers; and
    one or more processors connected to the one or more memories and the one or more transceivers, wherein the one or more processors execute the instructions to:
    select a first synchronization source based on a sidelink synchronization priority;
    obtain a first synchronization based on the first synchronization source;
    receive a plurality of synchronization signals from a plurality of synchronization sources;
    obtain a plurality of synchronizations based on the plurality of synchronization signals;
    select a second synchronization source among the plurality of synchronization sources, based on a gap between a time related to the first synchronization and a time related to a second synchronization being greater than or equal to a threshold value,
    wherein the second synchronization is obtained based on the second synchronization source; and
    transmit a sidelink-synchronization signal block (S-SSB) block to a second device based on the first synchronization or the second synchronization,
    wherein the first synchronization source and the second synchronization source include global navigation satellite system (GNSS), base station, or a user equipment (UE),
    wherein the S-SSB block includes a sidelink primary synchronization signal (S-PSS), a sidelink secondary synchronization signal (S-SSS), and a physical sidelink broadcast channel (PSBCH).

15. A device adapted to control a first user equipment (UE), the device comprising:
one or more processors; and
one or more memories operably connectable to the one or more processors and storing instructions, wherein the one or more processors execute the instructions to:
select a first synchronization source based on a sidelink synchronization priority;
obtain a first synchronization based on the first synchronization source;
receive a plurality of synchronization signals from a plurality of synchronization sources;
obtain a plurality of synchronizations based on the plurality of synchronization signals;
select a second synchronization source among the plurality of synchronization sources, based on a gap between a time related to the first synchronization and a time related to a second synchronization being greater than or equal to a threshold value,
wherein the second synchronization is obtained based on the second synchronization source; and
transmit a sidelink-synchronization signal block (S-SSB) block to a second UE based on the first synchronization or the second synchronization,
wherein the first synchronization source and the second synchronization source include global navigation satellite system (GNSS), base station, or a UE,
wherein the S-SSB block includes a sidelink primary synchronization signal (S-PSS), a sidelink secondary synchronization signal (S-SSS), and a physical sidelink broadcast channel (PSBCH).

* * * * *